US012465472B2

(12) United States Patent
Allan et al.

(10) Patent No.: US 12,465,472 B2
(45) Date of Patent: Nov. 11, 2025

(54) METHODS OF INSECT CONTROL FOR AN ANIMAL, PRODUCTS THEREOF AND METHODS FOR THEIR PREPARATION

(71) Applicant: Chinook Contract Research Inc., Victoria (CA)

(72) Inventors: Nicholas Allan, Victoria (CA); Merle Olson, Victoria (CA); Joseph Ross, Victoria (CA)

(73) Assignee: CHINOOK CONTRACT RESEARCH INC. (CA)

( * ) Notice: Subject to any disclaimer, the term of this patent is extended or adjusted under 35 U.S.C. 154(b) by 0 days.

(21) Appl. No.: 18/900,544

(22) Filed: Sep. 27, 2024

(65) Prior Publication Data
US 2025/0017714 A1 Jan. 16, 2025

Related U.S. Application Data

(63) Continuation of application No. PCT/CA2024/050216, filed on Feb. 22, 2024.

(60) Provisional application No. 63/486,396, filed on Feb. 22, 2023.

(51) Int. Cl.
*A61D 7/00* (2006.01)
*A01K 27/00* (2006.01)
*A61D 9/00* (2006.01)

(52) U.S. Cl.
CPC .............. *A61D 7/00* (2013.01); *A01K 27/007* (2013.01); *A61D 9/00* (2013.01)

(58) Field of Classification Search
CPC ........................................................ A61D 7/00
See application file for complete search history.

(56) References Cited

U.S. PATENT DOCUMENTS

| | | | |
|---|---|---|---|
| 4,195,075 A | 3/1980 | Miller | |
| 4,930,451 A | 6/1990 | Miller et al. | |
| 5,505,958 A | 4/1996 | Bello et al. | |
| 6,001,384 A | 12/1999 | Jeannin | |
| 8,568,426 B2 | 10/2013 | Straehnz et al. | |
| 12,295,811 B2 | 5/2025 | Terry et al. | |
| 2003/0012806 A1* | 1/2003 | McBride-Sakal | A61B 17/12013 424/423 |
| 2005/0271694 A1 | 12/2005 | Mansouri | |
| 2006/0052757 A1 | 3/2006 | Fischer | |
| 2006/0259041 A1 | 11/2006 | Hoffman | |
| 2007/0191869 A1 | 8/2007 | Wadsworth et al. | |
| 2010/0233227 A1 | 9/2010 | Weber | |
| 2017/0319316 A1 | 11/2017 | Smith | |
| 2020/0246122 A1* | 8/2020 | Terry | A61K 31/167 |
| 2023/0104037 A1 | 4/2023 | Terry et al. | |

FOREIGN PATENT DOCUMENTS

| | | | | |
|---|---|---|---|---|
| ES | 2566577 A2 * | 4/2016 | ............. | A01N 25/00 |

OTHER PUBLICATIONS

Roche et al., Efficacy of a lidocaine impregnated elastrator band for castration and tail-docking in lambs, Animals 2023, 13, 13 pages.
Ross et al., Assessment of the effective tissue concentrations of injectable lidocaine and a lidocaine-impregnated latex band for castration in calves, Animals 2023, 13, 12 pages.
Ross et al., Assessment of the Effective Tissue Concentrations of Injectable Lidocaine and a Lidocaine-Impregnated Latex Band for Castration in Calves, Animals 2024, 14, 977, 12 pages.
Ross et al., Assessment of the Pharmacokinetics and Pharmacodynamics of Injectable Lidocaine and a Lidocaine-Impregnated Latex Band for Castration and Tail Docking in Lambs, Animals 2024, 14, 255, 13 pages.
Stewart et al., Do rubber rings coated with lignocaine reduce the pain associated with ring castration of lambs?, Applied Animal Behaviour Science 160 (2014), pp. 56 to 63.
International Search Report for PCT/US2018/046150 mailed on Oct. 15, 2018.
Written Opinion for PCT/US2018/046150 mailed on Oct. 15, 2018.
International Search Report for PCT/CA2024/050216 mailed on May 24, 2024.
Written Opinion for PCT/CA2024/050216 mailed on May 24, 2024.
Extended European Search Report for EP 18844097.8 mailed Apr. 14, 2021.
Chia et al., "Threshold temperatures and thermal requirements of black soldier fly *Hermetia illucens*: Implications for mass production", PLOS One, 2018, 13(11).
Colvin et al., "Benchmarking Australian sheep parasite control practices: a national online survey", Animal Prod Sci, 2020, 61: 237-245.
Crank, J., The Mathematics of Diffusion, 1975, 1-421, 2nd Edition, Brunel University, Clarendon Press, Oxford.
Fiorentino et al., "Development and validation of a microbiological assay for determination of chlorhexidine digluconate in aqueous solution", BJPS, 2013, 49(2): 351-358.
Holdsworth et al., "World Association for the Advancement of Veterinary Parasitology (W.A.A.V.P.) guidelines for evaluating the efficacy of ectoparasiticides against myiasis causing parasites on ruminants", Vet Parasitol, 2006, 136 (1): 15-28.
Kotze et al., "Control of sheep flystrike: what's been tried in the past and where to from here", Aust Vet J, 2022, 100: 1-19.
Kotze et al., "Resistance to dicyclanil and imidacloprid in the sheep blowfly, *Lucilia cuprina*, in Australia", Pest Manag Sci, 2022, 78: 4195-4206.

(Continued)

*Primary Examiner* — Gina C Justice
(74) *Attorney, Agent, or Firm* — Workman Nydegger

(57) ABSTRACT

There is provided methods for insect control, including controlling myiasis, in animals by affixing to the animal an elastomeric band having infused or contained within an insecticide, an insect repellant, lidocaine, or any combination thereof. The insect control may be a dual-mode control and may be in respect of existing or impending open wounds, including open wounds caused by castration, tail docking, umbilical cord ligation, or dehorning of an animal. There is also provided methods for castration, docking, umbilical cord ligation, or dehorning of an animal with concurrent insect control. Also provided are elastomeric bands for insect control and methods for preparing such elastomeric bands.

19 Claims, 14 Drawing Sheets

(56) References Cited

OTHER PUBLICATIONS

Lane et al., "Priority list of endemic diseases for the red meat industries", Project Report BAHE0010 Meat & Livestock Australia Limited, Sydney, 2015: 282.
Levot et al., ""), In vitro effectiveness of ivermectin and spinosad flystrike treatments against larvae of the Australian sheep blowfly *Lucilia cuprina* (Wiedemann) (Diptera: Calliphoridae)", Australian Journal of Entomology, 2008, 47: 365-369.
Marti et al., "Effect of band and knife castration of beef calves on welfare indicators of pain at three relevant industry ages: II. Chronic Pain", Journal of Animal Science, 2017: 4367-4380.
Melendez et al., "Effect of band and knife castration of beef calves on welfare indicators of pain at three relevant industry ages: I. Acute Pain", Journal of Animal Science, 2017, 95: 4532-4366.
Moya et al., "Effects of castration method and frequency of intramuscular injections of ketoprofen on behavioral and physiological indicators of pain in beef cattle", Journal of Animal Science, 2014, 92: 1684-1695.
Patriot Insecticide Cattle Ear Tag Safety Data Sheet. Revised Mar. 3, 2021.
Patriot Insecticide Ear Tag for Cattle, Template for Relevant Label Particulars, AP/MA approval No. 53910/0507, Australian Pesticides and Veterinary Medicines Authority.
Powell, "Lidocaine and Lidocaine Hydrochloride", Analytical profiles of drug substances, 1986, 15: 761-779.
Ramchandra, Atul M et al., "Pyrethroid Poisoning." Indian Journal of Critical Care Medicine, Dec. 2019; vol. 23.4 pp. 267-271.
Saville et al., "Development and Field Validation of Lidocaine-Loaded Castration Bands fo rBovine Pain Mitigation", 2020, Animals, 10(12): 2363.
Sevgi et al., "Antibacterial effects of lidocaine and adrenaline", Int Wound J, 2019, 16: 1190-1194.
Song, Weizhong et al., "Analyasis of the action of lidocaine on insect sodium channels". Insect Biochemistry and Molecular Biology, Sep. 17, 2010, vol. 41.1, pp. 36-41.
Svena et al., "Local Anesthetics as Antimicrobial Agents: A Review", Surgical Infections, 2008, 9(2): 205-213.
Tanaka et al., "Lidocaine Concentration in Oral Tissue by the Addition of Epinephrine", Anesth Prog, 2016, 63: 17-24.
The Use of Insecticide-Impregnated Cattle Ear Tags on the Halters of Horses, Ontario Ministry of Agriculture, Food and Rural Affairs. Accessed Nov. 28, 2022.
USP Monographs: Lidocaine Hydrochloride and Epinephrine Injection, 2007.
Y-Tex Agressor Approved E-Label, RLP. APVMA Approval No. 62199/119798.
Y-Tex Optimizer Approved E-Label, RLP. APVMA Approval No. 46406/119795.
Y-Tex Optimizer Product Information Sheet, Y-Tex Corporation.
Y-Tex Optimizer Safety Data Sheet, MSDS. Printed Oct. 13, 2015.
Y-Tex Python Approved E-Label, RLP. Apvma Approval No. 48148/119796.
Y-Tex Python Safety Data Sheet, MSDS. Printed Oct. 13, 2015.
Y-Tex Python Maxima Approved E-Label, RLP. APVMA Approval No. 57920/119799.
Y-Tex Python Maxima Product Information Sheet, Y-Tex Corporation.
Y-Tex Python Maxima Safety Data Sheet, MSDS. Printed 2015-10-13.
Y-Tex Warrior Approved E-Label, RLP. APVMA Approval No. 51524/119797.
Y-Tex Warrior Product Information Sheet, Y-Tex Corporation.
Y-Tex Warrior Safety Data Sheet, MSDS. Printed Oct. 13, 2015.

* cited by examiner

METHODS OF INSECT CONTROL FOR AN ANIMAL, PRODUCTS THEREOF AND METHODS FOR THEIR PREPARATION

CROSS-REFERENCE TO RELATED APPLICATION

The present invention is a continuation of PCT Application No. PCT/CA2024/050216 filed Feb. 22, 2024, which claims priority to, and benefit of, U.S. Patent Application Ser. No. 63/486,396, filed on Feb. 22, 2023. The entire content of each of the aforementioned patent applications is incorporated herein by reference.

TECHNICAL FIELD

The present disclosure generally relates to methods and products for insect control for an animal, and in particular improved methods for controlling myiasis and protecting open wounds of animals, such as livestock, from insects and flystrike.

BACKGROUND

In facultative myiasis, adult blow flies are attracted to wounds, skin lesions, or soiled hair coats. A common site is the breech, where blow flies may be attracted to areas soaked with blood, urine, or feces. Castration wounds and wounds associated with tail docking and dehorning in cattle, sheep and goats are particularly susceptible as they are frequently contaminated with blood products, urine, and/or feces. As adult female blow flies feed in these sites, they lay eggs, which hatch within 24 hours if conditions are correct. Larvae (maggots) move independently about the wound surface, ingesting dead cells, exudate, secretions, and debris.

This condition is known as strike or flystrike. The larvae (maggots) irritate, injure, and kill successive layers of skin and produce exudates. Maggots are active and feed voraciously, causing skin and muscle damage by secreting enzymes. Secondary blowflies are also attracted by the smell of decomposing tissue. Toxins released by damaged tissues and ammonia secreted by the maggots are absorbed through the lesions into the animal's bloodstream, causing illness and death in severe cases. Secondary infections are common and may also cause death if untreated.

The primary flies in the United States and Canada are *Phormia regina* and *Protophormia terraenovae* (the black blow flies) and *Lucilia sericata* (the green bottle fly). *Lucilia illustris, Cochliomyia macellaria* (secondary screwworm), and some other flies are usually secondary invaders. *Lucilia cuprina* is the most important primary fly in Australia and South Africa; *Lucilia sericata* in Great Britain; and *Lucilia cuprina, Lucilia sericata,* and *Calliphora stygia* in New Zealand.

Although there are many commercial topical sprays, gels, pour-ons, and dips to repel or kill the flies, each product has a limited duration of activity and repeated application is often required. In addition, the chemicals used in these products are typically in high concentration, which allow them to persist in the tissues of the animal, but also cause significant environmental contamination. Typical use of these products is often not localized, and this non-localized use increases the bioavailability of these chemicals to the environment.

Notwithstanding the usefulness of the above-described products and methods, a need still exists for better methods and products of controlling myiasis in a more efficient and inexpensive manner.

SUMMARY

The present disclosure provides methods of insect control for an animal and products produced therefor that are advantageous over existing technologies. Also provided herein are methods for castration, tail docking, umbilical cord ligation, or dehorning of an animal with concurrent insect control. Elastomeric bands are provided herein for the insect control for animals, and methods for their preparation are also provided. In particular, provided herein are methods controlling myiasis in an animal. In an embodiment, the animal is a livestock animal. In an embodiment, the animal is cattle, sheep, goat, deer, buffalo, pig (swine), or elk.

In an embodiment, the present disclosure relates to a method for controlling myiasis in an animal, the method comprising affixing to the animal an elastomeric band having infused or contained within one or both of an insecticide and an insect repellant.

In an embodiment, the present disclosure also relates to a method for treating or preventing flystrike in an animal, the method comprising affixing to the animal an elastomeric band having infused or contained within one or both of an insecticide and an insect repellant.

In an embodiment, the present disclosure also relates to a method for protecting an animal from insects, the method comprising affixing to the animal an elastomeric band having infused or contained within one or both of an insecticide and an insect repellant.

In an embodiment of the above methods, the affixing provides both a short-term and a long-term delivery and effect of the insecticide and/or insect repellant to a body surface of the animal and/or an environment in close proximity to the body surface.

In an embodiment, the present disclosure relates to a method for a dual-mode insect control for an animal, the method comprising affixing to the animal an elastomeric band having infused or contained within one or both of an insecticide and an insect repellant, wherein said affixing provides: a fast-acting mode in which a first portion of the insecticide and/or insect repellant is delivered to a body surface of the animal and/or an environment in close proximity to the body surface, immediately upon affixing the elastomeric band to the animal; and a slow-releasing mode in which a second portion of the insecticide and/or insect repellant is delivered to the body surface of the animal and/or the environment in close proximity to the body surface, gradually over a period of time after continued affixation of the elastomeric band to the animal.

In an embodiment of the method for dual-mode insect control, the fast-acting mode provides a short-term delivery and effect of the insecticide and/or insect repellant to the body surface of the animal and/or the environment in close proximity to the body surface; and the slow-releasing mode provides a long-term delivery and effect of the insecticide and/or insect repellant to the body surface of the animal and/or the environment in close proximity to the body surface.

In an embodiment of the method for dual-mode insect control, the short-term delivery and effect is a duration of between about 0 seconds and about 24 hours. In an embodiment, the long-term delivery and effect is a duration of between about 24 hours and about 4 months. In an embodiment, the long-term delivery and effect is a duration of between about 24 hours and about 2 months.

In an embodiment of the methods herein, the affixing of the elastomeric band to the animal is at or near an open wound on the animal. In an embodiment, the elastomeric band is infused with the insecticide and/or the insect repellant.

In an embodiment, the present disclosure relates to a method for castration, tail docking, umbilical cord ligation, or dehorning of an animal with concurrent insect control, the method comprising affixing to the animal an elastomeric band having infused or contained within an active agent for the topical control of pain and one or both of an insecticide and an insect repellant.

In an embodiment, the present disclosure relates to a method for controlling myiasis in an animal during castration, tail docking, umbilical cord ligation, or dehorning of the animal, the method comprising affixing to the animal an elastomeric band having infused or contained within an active agent for the topical control of pain and one or both of an insecticide and an insect repellant.

In an embodiment, the present disclosure relates to a method for treating or preventing flystrike in an animal during castration, tail docking, umbilical cord ligation, or dehorning of the animal, the method comprising affixing to the animal an elastomeric band having infused or contained within an active agent for the topical control of pain and one or both of an insecticide and an insect repellant.

In an embodiment, the present disclosure relates to a method for protecting an animal from insects during castration, tail docking, umbilical cord ligation, or dehorning of the animal, the method comprising affixing to the animal an elastomeric band having infused or contained within an active agent for the topical control of pain and one or both of an insecticide and an insect repellant.

In an embodiment of the methods herein, the affixing provides both a short-term and a long-term delivery and effect of the active agent for the topical control of pain and the insecticide and/or insect repellant to a body surface of the animal and/or an environment in close proximity to the body surface.

In an embodiment, the present disclosure relates to a method for a dual-mode insect control during castration, tail docking, umbilical cord ligation, or dehorning of an animal, the method comprising affixing to the animal an elastomeric band having infused or contained within an active agent for the topical control of pain and one or both of an insecticide and an insect repellant, wherein said affixing provides: a fast-acting mode in which a first portion of the active agent for the topical control of pain and the insecticide and/or insect repellant is delivered to a body surface of the animal and/or an environment in close proximity to the body surface, immediately upon affixing the elastomeric band to the animal; and a slow-releasing mode in which a second portion of the active agent for the topical control of pain and the insecticide and/or insect repellant is delivered to the body surface of the animal and/or the environment in close proximity to the body surface, gradually over a period of time after continued affixation of the elastomeric band to the animal.

In an embodiment of the method for a dual-mode insect control during castration, tail docking, umbilical cord ligation, or dehorning, the fast-acting mode provides a short-term delivery and effect of the active agent for the topical control of pain and the insecticide and/or insect repellent to the body surface of the animal and/or the environment in close proximity to the body surface; and the slow-releasing mode provides a long-term delivery and effect of the active agent for the topical control of pain and the insecticide and/or insect repellent to the body surface of the animal and/or the environment in close proximity to the body surface.

In an embodiment of the method for a dual-mode insect control during castration, tail docking, umbilical cord ligation, or dehorning, the short-term delivery and effect is a duration of between about 0 seconds and about 24 hours. In an embodiment, the long-term delivery and effect is a duration of between about 24 hours and about 4 months. In an embodiment, the long-term delivery and effect is a duration of between about 24 hours and about 2 months.

In an embodiment of certain methods disclosed herein, the affixing of the elastomeric band to the animal is to perform the castration, tail docking, umbilical cord ligation, or dehorning of the animal and the castration, tail docking, umbilical cord ligation, or dehorning of the animal creates an open wound on the animal.

In an embodiment of certain methods disclosed herein, the elastomeric band is infused with the topical control of pain and the insecticide and/or the insect repellant.

In an embodiment of certain methods disclosed herein, the active agent for the topical control of pain comprises one or more anesthetics; one or more analgesics; or any combination thereof. In an embodiment, the active agent for the topical control of pain is lidocaine, procaine, meloxicam, bupivacaine, levobupivacaine, or any combination thereof. In a particular embodiment, the active agent for the topical control of pain is lidocaine.

In an embodiment of certain methods disclosed herein, the elastomeric band further comprises one or more skin permeation or penetration enhancers. In an embodiment, the skin permeation or penetration enhancer comprises a fatty acid, a fatty acid ester, a poloxamer, a triglyceride, n-methyl pyrrolidone, terpineol, limonene, dimethyl sulfoxide, dimethylacetamide, isopropyl myristate, or any combination thereof.

In an embodiment of the disclosed methods, the elastomeric band comprises at least one of the insecticide, and the insecticide comprises an insect growth regulator, a macrocyclic lactone, a synthetic pyrethroid, an organophosphate, a spinosyn, a neonicotinoid, or any combination thereof. In an embodiment, the insecticide is a larvicide and is delivered to the animal at an effective larvicidal amount.

In an embodiment of the disclosed methods, the elastomeric band comprises at least one of the insect repellant, and the insect repellant comprises vetiver oil, cinnamon, lavender oil, neem oil, p-menthan-3,8-diol, vanillin, picardin, DEET, *Eucalyptus* oil, citronella oil, tea tree oil, or any combination thereof.

In an embodiment of the disclosed methods, at least one or both of the insecticide and the insect repellent is effective against lice, cattle grubs, screw worms, flies, mites, maggots, or larvae. In an embodiment, at least one or both of the insecticide and the insect repellent is effective against *Phormia regina, Protophormia terraenovae, Lucilia sericata, Lucilia illustris, Lucilia cuprina, Lucilia sericata, Calliphora stygia, Cochliomyia macellaria, Cochliomyia hominivorax, Dermatobia hominis, Hypoderma bovis, Hypoderma lineatum, Oestrus ovis*, or a combination thereof.

In an embodiment of the disclosed methods, the elastomeric band comprises an elastomeric material selected from a natural rubber, a synthetic rubber, a silicone, a polybutadiene, a polyisoprene, a polychloroprene, a nitrile, a poly (styrene-butadiene-styrene) (SBS), a styrene-ethylene-butylene-styrene (SEBS), an ethylene-propylene-diene monomer rubber (EPDM), a polyurethane, or any combination thereof. In an embodiment, the elastomeric band is sized and shaped for use as a ligature band.

In an embodiment of the disclosed methods, the animal is a livestock animal. In an embodiment, the animal is cattle, goat, sheep, pig (swine), deer, elk, buffalo, bison, moose, alpaca, horse, donkey, zebus, yak, gayal, reindeer, or camel. In an embodiment, the animal is open-pasture reared. In an embodiment, the animal is containment reared (e.g. in a contained housing). In a particular embodiment, the animal is cattle, goat, sheep, deer or elk. In an embodiment, the elastomeric band is affixed to the animal on or at a base of an animal part selected from a tail, a scrotum, a horn, an antler, a teat, an umbilicus, or a dermal growth (e.g. a cancer, a wart, etc.).

In an embodiment of the disclosed methods, the affixing of the elastomeric band to the animal is proximate an existing wound site or an impending wound site, wherein the elastomeric band releasably delivers the active agent for the topical control of pain and/or the one or both of the insecticide and the insect repellent to the existing wound site or a dermis of the impending wound site. In an embodiment, the existing wound site or the impending wound site is from castration, tail docking, de-antlering, umbilical cord ligation, or dehorning. In an embodiment, the existing wound site comprises myiasis, an abscess, a mange, an open wound, or any combination thereof. In a particular embodiment, the existing wound site comprises myiasis.

In an embodiment of the disclosed methods, only a portion of the elastomeric band comprises the insecticide and/or insect repellent, the portion being a defined and selective region or zone of active agent.

In an embodiment, the present disclosure relates to an elastomeric band comprising one or both of an insecticide and an insect repellant, infused or contained within an elastomeric material of the elastomeric band. In an embodiment, the elastomeric material is infused with the insecticide and/or the insect repellant.

In an embodiment, the elastomeric band further comprises an active agent for the topical control of pain infused or contained within the elastomeric material.

In an embodiment of the elastomeric band, the elastomeric material is infused with the active agent for the topical control of pain. In an embodiment, the active agent for the topical control of pain comprises one or more anesthetics; one or more analgesics; or any combination thereof.

In an embodiment of the elastomeric band, the active agent for the topical control of pain is lidocaine, procaine, meloxicam, bupivacaine, levobupivacaine, or any combination thereof. In a particular embodiment of the elastomeric band, the active agent for the topical control of pain is lidocaine. In a particular embodiment of the elastomeric band, the active agent for the topical control of pain is procaine.

In an embodiment, the elastomeric band further comprises one or more skin permeation or penetration enhancers. In an embodiment of the elastomeric band, the skin permeation or penetration enhancer comprises a fatty acid, a fatty acid ester, a poloxamer, a triglyceride, n-methyl pyrrolidone, terpineol, limonene, dimethyl sulfoxide, dimethylacetamide, or any combination thereof.

In an embodiment, the elastomeric band is a ligation apparatus.

In an embodiment of the elastomeric band, the insecticide comprises an insect growth regulator, a macrocyclic lactone, a synthetic pyrethroid, an organophosphate, a spinosyn, a neonicotinoid, or any combination thereof. In an embodiment, the insecticide is ivermectin or avermectin. In an embodiment, insecticide and wherein the insecticide is a larvicide. In an embodiment, the insecticide is one that combats a parasite. In an embodiment, the insect repellant comprises vetiver oil, cinnamon, lavender oil, neem oil, p-menthan-3,8-diol, vanillin, picardin, DEET, *Eucalyptus* oil, citronella oil, tea tree oil, or any combination thereof.

In an embodiment of the elastomeric band, the elastomeric material comprises a natural rubber, a synthetic rubber, a silicone, a polybutadiene, a polyisoprene, a polychloroprene, a nitrile, a poly(styrene-butadiene-styrene) (SBS), a styrene-ethylene-butylene-styrene (SEBS), an ethylene-propylene-diene monomer rubber (EPDM), a polyurethane, or any combination thereof.

In an embodiment of the elastomeric band, when the elastomeric band is affixed to an animal it provides release of the insecticide and/or the insect repellant by both a fast-acting mode and a slow-acting mode, wherein: during the fast-acting mode, a first portion of the insecticide and/or insect repellant is delivered to a body surface of the animal and/or an environment in close proximity to the body surface, immediately upon affixing the elastomeric band to the animal; and during the slow-releasing mode, a second portion of the insecticide and/or insect repellant is delivered to the body surface of the animal and/or the environment in close proximity to the body surface, gradually over a period of time after continued affixation of the elastomeric band to the animal. In an embodiment, the fast-acting mode provides a short-term delivery and effect of the insecticide and/or insect repellant to the body surface of the animal and/or the environment in close proximity to the body surface; and the slow-releasing mode provides a long-term delivery and effect of the insecticide and/or insect repellant to the body surface of the animal and/or the environment in close proximity to the body surface.

In an embodiment of the elastomeric band, only a portion of the elastomeric band comprises the insecticide and/or insect repellent, the portion being a defined and selective region or zone of active agent.

In an embodiment, the present disclosure also relates to a method of making an elastomeric band for a dual-mode insect control for an animal, the method comprising: providing a band formed of an elastomeric material; providing a solution comprising a solvent selected to swell the elastomeric material and at least one or both of an insecticide and an insect repellant; submersing at least a portion of the band in the solution to thereby infuse the portion of the band with the solution; removing the band from the solution; and drying the band to remove the solvent, whereby the insecticide and/or the insect repellant are distributed within and throughout the portion of the band to form the elastomeric band for a dual-mode insect control for an animal, wherein the dual-mode is: a fast-acting mode in which a first portion of the insecticide and/or insect repellant is delivered to a body surface of the animal and/or an environment in close proximity to the body surface, immediately upon affixing the elastomeric band to the animal; and a slow-releasing mode in which a second portion of the insecticide and/or insect repellant is delivered to the body surface of the animal and/or the environment in close proximity to the body surface, gradually over a period of time after continued affixation of the elastomeric band to the animal.

In an embodiment of the methods for preparing the elastomeric band, the entire band is submersed in the solution to thereby infuse the entire band with the solution.

In an embodiment of the methods for preparing the elastomeric band, only a portion of the band is submersed in the solution to thereby infuse only the portion of entire band with the solution, wherein the portion is less than the entire band. In an embodiment, the portion of the band is between about 10% and about 75% of the surface area of the band. In an embodiment, the portion of the band is between about 25% and about 65% of the surface area of the band.

In an embodiment of the method making the elastomeric band, the dual-mode is for insect control during castration, tail docking, umbilical cord ligation, dehorning of the animal, and the step of preparing the solution further comprises an active agent for the topical control of pain, and wherein: during the fast-acting mode, the first portion is of the active agent for the topical control of pain and the insecticide and/or insect repellant for delivery to the body surface of the animal and/or the environment in close proximity to the body surface, immediately upon affixing the elastomeric band to the animal; and during the slow-releasing mode, the second portion is of the active agent for the topical control of pain and the insecticide and/or insect repellant for delivery to the body surface of the animal and/or the environment in close proximity to the body surface, gradually over a period of time after continued affixation of the elastomeric band to the animal.

In an embodiment of the method making an elastomeric band, in the step of submersing, the portion of the band is swelled until equilibrium swelling of the portion of the band and infusion of the active agent for the topical control of pain and/or the one or both of the insecticide and insect repellant into the band is achieved. In an embodiment, the portion of the band is swelled over 100% of its volume with the solution. In an embodiment, the solution further contains one or more skin permeation or penetration enhancers; one or more antimicrobial agents; one or more antibiotics; one or more anti-inflammatory agents; one or more hormones; one or more chemical indicators; one or more vasoconstrictor agents; or any combination thereof.

In an embodiment of the method making an elastomeric band, the insecticide comprises an insect growth regulator, a macrocyclic lactone, a synthetic pyrethroid, an organophosphate, a spinosyn, a neonicotinoid, or any combination thereof. In an embodiment, the insecticide is ivermectin or avermectin. In an embodiment, the insecticide is a larvicide. In an embodiment, the insecticide is one that combats a parasite. In an embodiment, the insect repellant comprises vetiver oil, cinnamon, lavender oil, neem oil, p-menthan-3, 8-diol, vanillin, picardin, DEET, *Eucalyptus* oil, citronella oil, tea tree oil, or any combination thereof.

In an embodiment of the method making an elastomeric band, the elastomeric material comprises a natural rubber, a synthetic rubber, a silicone, a polybutadiene, a polyisoprene, a polychloroprene, a nitrile, a poly(styrene-butadiene-styrene) (SBS), a styrene-ethylene-butylene-styrene (SEBS), an ethylene-propylene-diene monomer rubber (EPDM), a polyurethane, or any combination thereof.

In an embodiment, the present disclosure also relates to an elastomeric band prepared by the methods disclosed herein.

In an embodiment, the present disclosure relates to the use of the elastomeric band disclosed herein for controlling myiasis in an animal.

In an embodiment, the present disclosure relates to the use of the elastomeric band disclosed herein for treating or preventing flystrike in an animal.

In an embodiment, the present disclosure relates to the use of the elastomeric band disclosed herein for protecting an animal from insects.

In an embodiment of the uses herein, the elastomeric band provides both a short-term and a long-term delivery and effect of the insecticide and/or insect repellant to a body surface of the animal and/or an environment in close proximity to the body surface.

In an embodiment, the present disclosure relates to the use of the elastomeric band disclosed herein for castration, tail docking, umbilical cord ligation, or dehorning of an animal with concurrent insect control.

In an embodiment, the present disclosure relates to the use of the elastomeric band disclosed herein for controlling myiasis in an animal during castration, tail docking, umbilical cord ligation, or dehorning of the animal.

In an embodiment, the present disclosure relates to the use of the elastomeric band disclosed herein for treating or preventing flystrike in an animal during castration, tail docking, umbilical cord ligation, or dehorning of the animal.

In an embodiment, the present disclosure relates to the use of the elastomeric band disclosed herein for protecting an animal from insects during castration, tail docking, umbilical cord ligation, or dehorning of the animal.

In an embodiment, the present disclosure relates to a method for controlling myiasis in an animal, the method comprising affixing to the animal an elastomeric band infused with lidocaine.

In an embodiment, the present disclosure relates to a method for treating or preventing flystrike in an animal, the method comprising affixing to the animal an elastomeric band infused with lidocaine.

In an embodiment, the present disclosure relates to a method for protecting an animal from insects, the method comprising affixing to the animal an elastomeric band infused with lidocaine.

In an embodiment of the methods herein involving an elastomeric band infused with lidocaine, the affixing provides both a short-term and a long-term delivery and effect of the lidocaine to a body surface of the animal and/or an environment in close proximity to the body surface.

In an embodiment, the present disclosure relates to a method for a dual-mode insect control for an animal, the method comprising affixing to the animal an elastomeric band infused with lidocaine, wherein said affixing provides: a fast-acting mode in which a first portion of the lidocaine is delivered to a body surface of the animal and/or an environment in close proximity to the body surface, immediately upon affixing the elastomeric band to the animal; and a slow-releasing mode in which a second portion of the lidocaine is delivered to the body surface of the animal and/or the environment in close proximity to the body surface, gradually over a period of time after continued affixation of the elastomeric band to the animal.

In an embodiment of the methods herein involving an elastomeric band infused with lidocaine, the fast-acting mode provides a short-term delivery and effect of the lidocaine to the body surface of the animal and/or the environment in close proximity to the body surface; and the slow-releasing mode provides a long-term delivery and effect of the lidocaine to the body surface of the animal and/or the environment in close proximity to the body surface. In an embodiment, the short-term delivery and effect is a duration of between about 0 seconds and about 24 hours. In an embodiment, the long-term delivery and effect is a duration of between about 24 hours and about 4 months.

In an embodiment of the methods herein involving an elastomeric band infused with lidocaine, the affixing of the elastomeric band to the animal is at or near an open wound on the animal.

In an embodiment, the present disclosure relates to a method for controlling myiasis in an animal during castration, tail docking, umbilical cord cutting/clamping, or dehorning of the animal, the method comprising affixing to the animal an elastomeric band infused with lidocaine.

In an embodiment, the present disclosure relates to a method for treating or preventing flystrike in an animal during castration, tail docking, umbilical cord cutting/clamping, or dehorning of the animal, the method comprising affixing to the animal an elastomeric band infused with lidocaine.

In an embodiment, the present disclosure relates to a method for protecting an animal from insects during castration, tail docking, umbilical cord cutting/clamping, or dehorning of the animal, the method comprising affixing to the animal an elastomeric band infused with lidocaine.

In an embodiment of the methods herein involving an elastomeric band infused with lidocaine, the affixing provides both a short-term and a long-term delivery and effect of the lidocaine to a body surface of the animal and/or an environment in close proximity to the body surface.

In an embodiment, the present disclosure relates to a method for a dual-mode insect control during castration, tail docking, umbilical cord cutting/clamping, or dehorning of an animal, the method comprising affixing to the animal an elastomeric band infused with lidocaine, wherein said affixing provides: a fast-acting mode in which a first portion of the lidocaine is delivered to a body surface of the animal and/or an environment in close proximity to the body surface, immediately upon affixing the elastomeric band to the animal; and a slow-releasing mode in which a second portion of the lidocaine is delivered to the body surface of the animal and/or the environment in close proximity to the body surface, gradually over a period of time after continued affixation of the elastomeric band to the animal. In an embodiment, the fast-acting mode provides a short-term delivery and effect of the lidocaine to the body surface of the animal and/or the environment in close proximity to the body surface; and the slow-releasing mode provides a long-term delivery of the lidocaine to the body surface of the animal and/or the environment in close proximity to the body surface. In an embodiment, the short-term delivery and effect is a duration of between about 0 seconds and about 24 hours. In an embodiment, the long-term delivery and effect is a duration of between about 24 hours and about 4 months.

In an embodiment of the methods herein involving an elastomeric band infused with lidocaine, the affixing of the elastomeric band to the animal is to perform the castration, tail docking, umbilical cord cutting/clamping, or dehorning of the animal and the castration, tail docking, umbilical cord cutting/clamping, or dehorning of the animal creates an open wound on the animal.

In an embodiment of the methods herein involving an elastomeric band infused with lidocaine, the elastomeric band comprises an elastomeric material selected from a natural rubber, a synthetic rubber, a silicone, a polybutadiene, a polyisoprene, a polychloroprene, a nitrile, a poly (styrene-butadiene-styrene) (SBS), a styrene-ethylene-butylene-styrene (SEBS), an ethylene-propylene-diene monomer rubber (EPDM), a polyurethane, or any combination thereof.

In an embodiment of the methods herein involving an elastomeric band infused with lidocaine, the elastomeric band is sized and shaped for use as a ligature band.

In an embodiment of the methods herein involving an elastomeric band infused with lidocaine, the animal is a cattle, goat, sheep, pig (swine), deer, elk, buffalo, bison, moose, alpaca, horse, donkey, zebus, yak, gayal, reindeer, or camel. In an embodiment, the animal is a cattle, goat, sheep, deer or elk. In an embodiment, the animal is open-pasture or containment reared.

In an embodiment of the methods herein involving an elastomeric band infused with lidocaine, the elastomeric band is affixed to the animal on or at a base of an animal part selected from a tail, a scrotum, a horn, an umbilical cord, or an antler. In an embodiment, the affixing of the elastomeric band to the animal is proximate an existing wound site or an impending wound site, wherein the elastomeric band releasably delivers the lidocaine to the existing wound site or a dermis of the impending wound site. In an embodiment, the existing wound site or the impending wound site is from castration, tail docking, de-antlering, umbilical cord cutting/clamping, or dehorning. In an embodiment, the existing wound site comprises myiasis, an abscess, a mange, an open wound, or any combination thereof. In an embodiment, the existing wound site comprises myiasis.

In an embodiment of the methods herein involving an elastomeric band infused with lidocaine, only a portion of the elastomeric band comprises the lidocaine, the portion being a defined and selective region or zone of active agent.

In an embodiment, the present disclosure relates to the use of an elastomeric band infused with lidocaine for controlling myiasis in an animal. In an embodiment, the present disclosure relates to the use of an elastomeric band infused with lidocaine for treating or preventing flystrike in an animal. In an embodiment, the present disclosure relates to the use of an elastomeric band infused with lidocaine for protecting an animal from insects. In an embodiment of each of these uses, the elastomeric band provides both a short-term and a long-term delivery and effect of the lidocaine to a body surface of the animal and/or an environment in close proximity to the body surface.

In an embodiment, the present disclosure relates to the use of an elastomeric band infused with lidocaine for castration, tail docking, umbilical cord ligation, or dehorning of an animal with concurrent insect control.

In an embodiment, the present disclosure relates to the use of an elastomeric band infused with lidocaine for controlling myiasis in an animal during castration, tail docking, umbilical cord ligation, or dehorning of the animal.

In an embodiment, the present disclosure relates to the use of an elastomeric band infused with lidocaine for treating or preventing flystrike in an animal during castration, tail docking, umbilical cord ligation, or dehorning of the animal.

In an embodiment, the present disclosure relates to the use of an elastomeric band infused with lidocaine for protecting an animal from insects during castration, tail docking, umbilical cord ligation, or dehorning of the animal.

Other aspects and embodiments of the disclosure are evident in view of the detailed description provided herein.

BRIEF DESCRIPTION OF THE FIGURES

Further advantages, permutations, and combinations of the invention will now appear from the above and from the following detailed description of the various particular embodiments of the invention taken together with the accompanying drawings, each of which are intended to be non limiting, in which.

DETAILED DESCRIPTION

Figure 1:
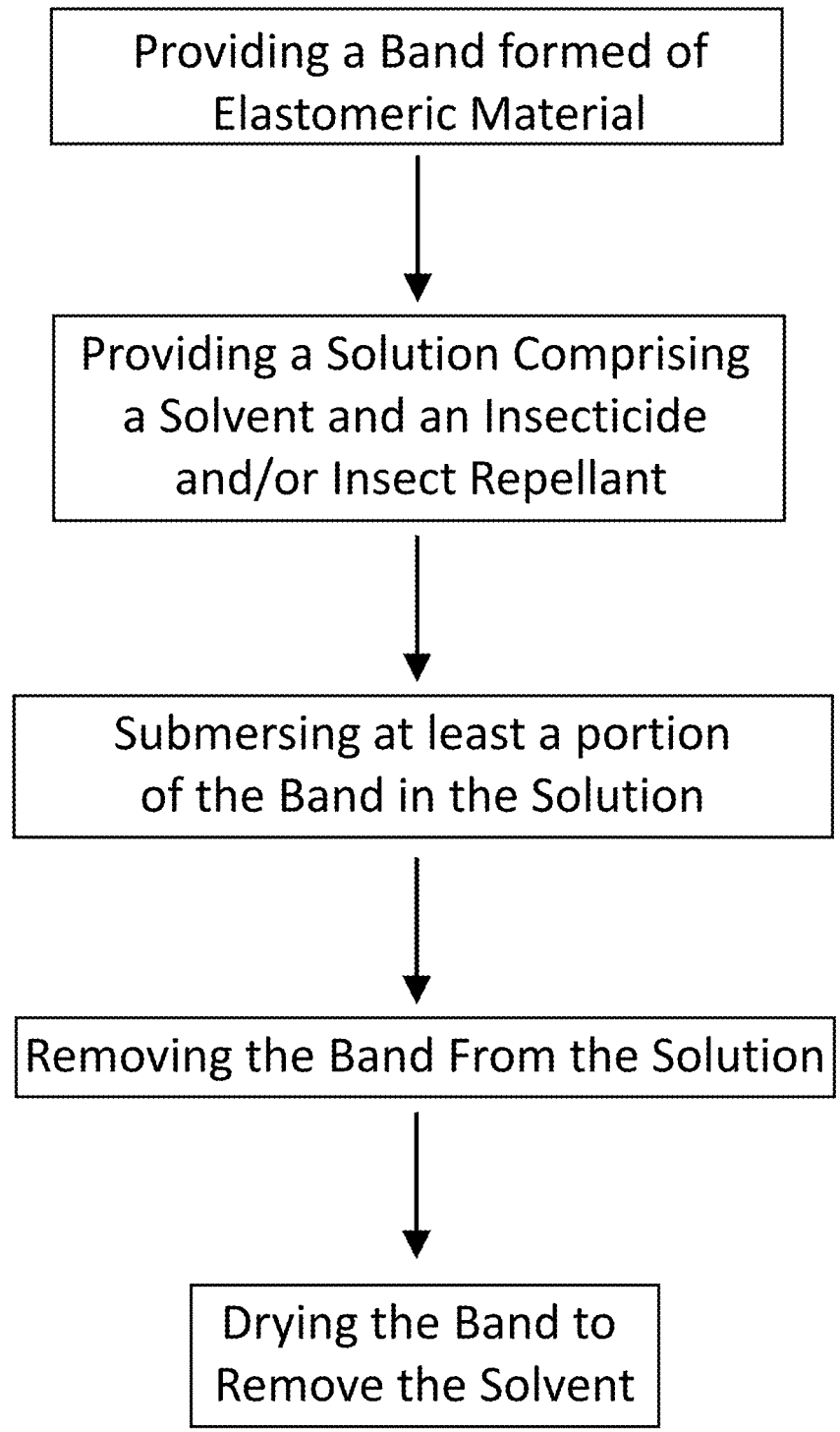
FIG. 1 shows a flow chart depicting an exemplary method for preparing the elastomeric bands of the present disclosure.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the suitable methods and materials are described below.

The present disclosure relates to methods and products for the control of insects in and around an animal, and in particular in and around an open wound on the animal. The methods and products of the present disclosure advantageously control myiasis and, more generally, protect animals from insects and complications therefrom (e.g. infection). In an embodiment, the methods herein, such as for controlling myiasis in an animal, comprise affixing to the animal an elastomeric band infused with an insecticide and/or an insect repellent. In an embodiment, the methods herein, such as for controlling myiasis in an animal, comprise affixing to the animal an elastomeric band infused with lidocaine. In an embodiment of the present disclosure, the primary use of the elastomeric band is for castration, tail docking, de-antlering, umbilical cord ligation, or dehorning of an animal, and the insecticide and/or insect repellent advantageously provides concurrent insect control.

An advantage of the methods of the present disclosure is that the elastomeric band dispenses one or both of an insecticide and an insect repellent over an extended period, so as to provide both fast-acting (e.g. immediate) and slow-acting (e.g. long-term) protection of the animal from insects, in particular animals with open wounds and/or animals undergoing castration, tail docking, umbilical cord ligation, or dehorning. In some embodiments, also advantageous is that the elastomeric bands of the present disclosure avoid situations where high concentrations of insecticide, insect repellant or other agents are released into the environment. As used herein, "other agents" may refer to any number of additional compounds or substances that may be included in the elastomeric band, including those described herein such as an active agent for the topical control of pain, a permeation enhancer, a penetration enhancer, etc.

The insecticide may be delivered concurrently with the other active agents through the same device, i.e. the elastomeric band. Thus, in select embodiments, the elastomeric band of the present disclosure avoids the need of extraneous insect control through additional methods or approaches, and alleviates various issues with the supply of an insecticide or insect repellent through sprays, gels, pour-ons and dips (e.g. environmental contamination, need for repeated application, lack of extended protection, etc.).

Although the present disclosure focuses on use of the elastomeric band for situations involving castration, tail docking, de-antlering, umbilical cord ligation, or dehorning, it will be understood that the elastomeric band comprising insecticide and/or insect repellent may be used on any animal undergoing any procedure that would benefit from a fast-acting mode and a slow-releasing mode of release of the insecticide, the insect repellent, and/or other agent, including any situation where an animal has an existing open wound or is at risk of developing an open wound.

Through the localized and slow-releasing mode of release of the insecticide and/or insect repellent, certain embodiments the present application reduce the stress imparted on animals during castration, tail docking, de-antlering, umbilical cord ligation, or dehorning, and may also reduce the likelihood of swelling and infection (in particular, myiasis).

In an embodiment therefore, the present disclosure relates to a method for controlling myiasis in an animal, the method comprising affixing to the animal an elastomeric band having infused or contained within one or both of an insecticide and an insect repellent. As used herein, by "controlling myiasis" it is intended to mean one or any combination of preventing myiasis from occurring, reducing the duration of myiasis, reducing the severity of myiasis, maintaining the severity of myiasis at an acceptable threshold, or alleviating or ridding the animal of myiasis.

In another embodiment, the present disclosure relates to a method for treating or preventing flystrike in an animal, the method comprising affixing to the animal an elastomeric band having infused or contained within one or both of an insecticide and an insect repellant. As used herein, by "preventing flystrike" it is intended to mean the prevention or avoidance of flies laying eggs on the animal, including within open wounds. As will be appreciated, preventing flystrike may be considered synonymous with preventing myiasis from occurring. As used herein, "preventing flystrike" is distinguished from "controlling myiasis" since the term "preventing flystrike" is intended to refer to the actual prevention or avoidance of flies laying their the eggs, whereas "controlling myiasis" is intended to refer to an actual control, treatment or alleviation of the eggs once they are laid (e.g. in a wound).

In another embodiment, the present disclosure relates to a method for protecting an animal from insects, the method comprising affixing to the animal an elastomeric band having infused or contained within one or both of an insecticide and an insect repellent. As used herein, by "protecting an animal from insects" it is intended to mean any type of attack or nuisance to the animal by an insect. It will be appreciated that protecting an animal for insects encompasses both controlling myiasis and preventing flystrike, but is broader in including other situations of insect attack or nuisance of an animal.

In embodiments of the present disclosure, the elastomeric band is intended for affixing on an animal. The animal may be any animal that would benefit from the elastomeric band of the present disclosure. In a particular embodiment, the animal is a livestock animal. In an embodiment, the animal is cattle, goat, sheep, pig (swine), deer, elk, buffalo, bison, moose, alpaca, horse, donkey, zebus, yak, gayals, reindeer, camel, or the like. In an embodiment, the animal is open pasture reared. In an embodiment, the animal is cattle. In an embodiment, the animal is goat. In an embodiment, the animal is sheep.

The elastomeric band may be of any suitable size or shape to fit on an animal or a body part of an animal. In an embodiment, the elastomeric material is sized and shaped for use as a ligature band. In a select embodiment, the elastomeric band is for use as a system of castration, tail docking, de-antlering, umbilical cord ligation, dehorning, or the like. The animal part may include, without limitation, a tail, scrotum, one or more horns, one or more antlers, or the like.

As used herein, the term "affixing" means to fixedly attach by any suitable means. In an embodiment, affixing to an animal or animal part may comprise tightening around, pinning to, sticking to, fastening to or around, joining to, clipping to, pasting on, tacking on, connecting on, binding to, coupling on, the like, or any combination thereof. In an embodiment, affixing to an animal or animal part comprises tightening around. In an embodiment, affixing to an animal comprises stretching an appropriately sized and shaped elastomeric band around an animal part and releasing the band such that it tightly grips around the body part of the animal. In an embodiment, the affixing is at or near an open wound on the animal.

In an embodiment, the present disclosure also relates to a method for castration, tail docking, umbilical cord ligation, or dehorning of an animal with concurrent insect control, the method comprising affixing to the animal an elastomeric band having infused or contained within an active agent for the topical control of pain and one or both of an insecticide and an insect repellant. As used herein, by "concurrent insect control" it is meant that the insect control occurs over a portion of or the entirety of the duration of the castration, tail docking, umbilical cord ligation, or dehorning procedure. In an embodiment, the insect control occurs over the entirety of the duration of the castration, tail docking, umbilical cord ligation, or dehorning procedure.

As used herein, the term "insect control" refers generally to the repelling and killing of insects and larvae. The term encompasses other terminology used herein, including preventing, controlling, or treating myiasis; preventing flystrike; and protecting an animal from insects.

In an embodiment, the present disclosure also relates to a method for controlling myiasis in an animal during castration, tail docking, umbilical cord ligation, or dehorning of the animal, the method comprising affixing to the animal an elastomeric band having infused or contained within an active agent for the topical control of pain and one or both of an insecticide and an insect repellent. The control of myiasis may occur over a portion of or the entirety of the duration of the castration, tail docking, umbilical cord ligation, or dehorning procedure. In an embodiment, the control of myiasis occurs over the entirety of the duration of the castration, tail docking, umbilical cord ligation, or dehorning procedure.

In an embodiment, the present disclosure also relates to a method for treating or preventing flystrike in an animal during castration, tail docking, umbilical cord ligation, or dehorning of the animal, the method comprising affixing to the animal an elastomeric band having infused or contained within an active agent for the topical control of pain and one or both of an insecticide and an insect repellant. The prevention of flystrike may occur over a portion of or the entirety of the duration of the castration, tail docking, umbilical cord ligation, or dehorning procedure. In an embodiment, the prevention of flystrike occurs over the entirety of the duration of the castration, tail docking, umbilical cord ligation, or dehorning procedure.

In an embodiment, the present disclosure also relates to a method for protecting an animal from insects during castration, tail docking, umbilical cord ligation, or dehorning of the animal, the method comprising affixing to the animal an elastomeric band having infused or contained within an active agent for the topical control of pain and one or both of an insecticide and an insect repellent. The protection of the animal from insects may occur over a portion of or the entirety of the duration of the castration, tail docking, umbilical cord ligation, or dehorning procedure. In an embodiment, the protection of the animal from insects occurs over the entirety of the duration of the castration, tail docking, umbilical cord ligation, or dehorning procedure.

In embodiments of the methods herein where the control of pain is desired, such as during castration, tail docking, de-antlering, umbilical cord ligation, or dehorning, or in a situation of moderate to severe open wounds, the elastomeric band ideally comprises the active agent for the topical control of pain. In an embodiment, the active agent for the topical control of pain comprises one or more anesthetics; one or more analgesics; or any combination thereof. In a particular embodiment, the active agent for the topical control of pain is lidocaine, procaine, meloxicam, bupivacaine, levobupivacaine, or any combination thereof. In an embodiment, the active agent for the topical control of pain is lidocaine. In an embodiment, the active agent for the topical control of pain is procaine.

As used herein, the term "insecticide" refers to any chemical, compound, or medicament that is capable of killing insects, parasites, and/or larvae (e.g. a larvicide). In exemplary embodiments, the insecticide may comprise or be an insect growth regulator, a macrocyclic lactone, a synthetic pyrethroid, an organophosphate, a spinosyn, a neonicotinoid, or any combination thereof. Non-limiting examples of insect growth regulators include benzophenyl ureas, triazine and pyrimidine derivatives (e.g., diflubenzuron, triflumuron, cyromazine, and dicyclanil). Non-limiting examples of macrocyclic lactones include ivermectin, avermectin, and abamectin. Non-limiting examples of synthetic pyrethroids include alpha-cypermethin, cyhalothrin, cypermethrin, permethrin, fenvalerate, tetra-chloryinphos, and deltamethrin. Non-limiting examples of organophosphates include diazinon, chlorfenvinphos, cresylic acid, proctamphos, and temephos. Non-limiting examples of spinosyns include spinosad. Non-limiting examples of neonicotinoids include imidacloprid.

As shown herein, a surprising advantage is that lidocaine can be used as an effective insecticide within the elastomeric bands of the present disclosure. Therefore, as used herein, the term "insecticide" should be taken to include lidocaine, depending on context. For example, the mere reference to "insecticide" without mention of either an agent for the topical control of pain or lidocaine should be taken to mean that the insecticide can any insecticide, including lidocaine. In contrast, reference to "insecticide and/or insect repellent and an agent for topical control of pain", "insecticide and/or insect repellent and lidocaine", "insecticide and an agent for topical control of pain", "insecticide and lidocaine", "insect repellent and an agent for topical control of pain", "insect repellant and lidocaine, or the like, should be taken to mean that the insecticide and insect repellant are something other than lidocaine.

As used herein, the term "insect repellent" refers to any chemical, compound, or medicament that is capable of repelling insects, i.e. keeping insects away. Many insecticides also function as insect repellents. Thus, in an embodiment, the insect repellent is any one or more of the insecticides described herein. In addition, many essential oils are capable of acting as an insect repellent. Thus, in an embodiment, the insect repellent is an essential oil. Non-limiting examples of essential oils include vetiver oil, cinnamon, lavender oil, neem oil, p-menthan-3,8-diol, vanillin, *Eucalyptus* oil, citronella oil, tea tree oil, or any combination thereof. In an embodiment, the insect repellent comprises N,N-dimethyl-meta-toluamide (DEET), icaridin, picardin, permethrin, soybean oil, metofluthrin, p-menthane-3,8-diol, or any combination thereof.

Particularly preferred are insecticides and insect repellants that are effective against lice, cattle grubs, screw worms, flies, mites, maggots, larvae, or the like.

In an exemplary embodiment, the organisms that the insecticide and/or the insect repellant is effective against include but are not limited to *Phormia regina, Protophormia terraenovae, Lucilia sericata, Lucilia illustris, Lucilia cuprina, Lucilia sericata, Calliphora stygia, Cochliomyia macellaria, Cochliomyia hominivorax, Dermatobia hominis, Hypoderma bovis, Hypoderma lineatum, Oestrus ovis*, or a combination thereof.

One skilled in the art will recognize that the effective insecticidal and/or larvicidal amount of an insecticide is tied to the particular insecticide being used and the particular insect targeted by the insecticide. Likewise, the effective amount of an insect repellant is tied to the particular insect repellant being used and the particular insect to be repelled. Environmental or other conditions (e.g. rearing conditions) may also contribute to effective amounts.

The elastomeric material may be any material capable of being stretched and/or retracted. In an embodiment, the elastomeric material is or comprises a natural rubber, a synthetic rubber, a silicone, a polybutadiene, a polyisoprene, a polychloroprene, a nitrile, a poly(styrene-butadiene-styrene) (SBS), a styrene-ethylene-butylene-styrene (SEBS), an ethylene-propylene-diene monomer rubber (EPDM), a polyurethane, or any combination thereof.

Band, as used herein, refers to a band, ring, tube, straw, conduit, plastic crimping device, zip tie, or the like. In some embodiments, the band is a length of tube or rubber having two ends; in these embodiments, the band may also include one or more fasteners and/or one or more crimpers or clamps. In other embodiments, the band is a closed loop. The band of the present invention is described in more detail below.

In the context of the present disclosure, the insecticide, insect repellant or other agents (e.g. active agent for the topical control of pain) may be infused or contained within the elastomeric material. By "infused", it is meant that the insecticide, insect repellant, or any other agents used are absorbed into the elastomeric material and are not merely coated on the exterior surface of the elastomeric material or contained within an internal compartment of the elastomeric bands. In an embodiment, when the insecticide, insect repellant, or any other agents is infused into the elastomeric material, it is substantially evenly distributed throughout the elastomeric material. The density of the elastomeric material and or other characteristics of the elastomeric material may be selected to control the rate of diffusion of the insecticide, insect repellant, or other agents out of the elastomeric band.

In an embodiment, the present disclosure also relates to a method of making an elastomeric band for a dual-mode insect control for an animal, the method comprising: providing a band formed of an elastomeric material; providing a solution comprising a solvent selected to swell the elastomeric material and at least one or both of an insecticide and an insect repellant; submersing at least a portion of the band in the solution to thereby infuse the portion of the band with the solution; removing the band from the solution; and drying the band to remove the solvent, whereby the insecticide and/or the insect repellent are distributed within and throughout the portion of the band to form the elastomeric band for the dual-mode insect control for the animal, wherein the dual-mode is: a fast-acting mode in which a first portion of the insecticide and/or insect repellant is delivered to a body surface of the animal and/or an environment in close proximity to the body surface, immediately upon affixing the elastomeric band to the animal; and a slow-releasing mode in which a second portion of the insecticide and/or insect repellant is delivered to the body surface of the animal and/or the environment in close proximity to the body surface, gradually over a period of time after continued affixation of the elastomeric band to the animal (FIG. 1).

In an embodiment, the dual-mode is for insect control during castration, tail docking, umbilical cord ligation, or dehorning of the animal, and the step of preparing the solution further comprises an active agent for the topical control of pain. In such instances, during the fast-acting mode the first portion is of the active agent for the topical control of pain and the insecticide and/or insect repellent for delivery to the body surface of the animal and/or the environment in close proximity to the body surface, immediately upon affixing the elastomeric band to the animal. Likewise, in such instances, during the slow-releasing mode, the second portion is of the active agent for the topical control of pain and the insecticide and/or insect repellent for delivery to the body surface of the animal and/or the environment in close proximity to the body surface, gradually over a period of time after continued affixation of the elastomeric band to the animal.

As used herein, the term "body surface" refers to the surface of any body part of an animal, including without limitation a dermal surface or an umbilical cord tissue. The body surface may, for example, be a tail, a scrotum, a horn, an antler, a teat, an umbilicus, or a dermal growth (e.g. a cancer, a wart, etc.).

With respect to the step of preparing a solution comprising a solvent selected to swell the elastomeric material and at least one or both of an insecticide and an insect repellant, the solvent may be any suitable solvent that swells, hydrates and/or penetrates the elastomeric material and which is compatible with the insecticide and/or insect repellent. In an embodiment, the solvent comprises one or more of an alcohol, an ester, an ether, or any combination thereof. In an embodiment, the solvent comprises an ester and an alcohol. In an embodiment, the solvent comprises isopropyl myristate and ethanol. The solution may be prepared by mixing the insecticide and/or insect repellant with the solvent.

With respect to the step of submersing at least a portion of the band in the solution, the band or a portion thereof may be placed into the solution by any suitable means. In an embodiment, one or more bands are placed in a basket that is submersed into the solution. In an embodiment, one or more bands are submersed into the solution with mixing. In an embodiment, one or more bands are placed into the solution in a scalable containing, whereby the container is sealed upon addition of the bands to the solution. In an embodiment, tetrahydrofuran is added to the sealed container and mixing is performed of the contents of the sealed container with a circulating pump.

With respect to the step of submersing at least a portion of the band in the solution, in select embodiments the elastomeric material is swelled to near its equilibrium with the materials to be absorbed into the elastomeric material. In select embodiments, those materials include an insecticide and an insect repellent. In select embodiments, those materials include an insecticide, an insect repellent, and the active agent for the topical control of pain. In select embodiments, the band is submersed in a volatile organic solvent solution that contains the insecticide, the insect repellant, and/or the active agent for the topical control of pain dissolved in the solvent. In some embodiments, the solvent may be DMSO (dimethyl sulfoxide) or THF (tetrahydrofuran). The solvent swells the elastomeric material of the band and carries the agents into the elastic material of the band by diffusion. The bands are soaked in the solution until equilibrium swelling of the band and diffusion of the agents into the material of the band has been achieved.

In some embodiments, the step of submersing comprises partially submersing a portion of the band and the active agent is distributed within and throughout the submersed portion of the elastomeric band.

In an embodiment, by "equilibrium of swelling", it is meant that the band is submersed in the solution until swelling of the band has reached its maximum for any given solution (i.e. the band can no longer take up any more of the solution). In an embodiment, the equilibrium of swelling is when the band has swelled by over 100% of its volume with the solution. In an embodiment, the equilibrium of swelling is when the band has swelled by over 150%, by over 200%, by over 250%, by over 500%, or more of its volume with the solution.

The step of submersing incorporates the elastomeric band with the solution, rather than just depositing it on the surface of the elastomeric material. This is significant because in use for castration, tail docking, de-antlering, umbilical cord ligation, or dehorning, the elastomeric band typically undergoes extreme elastic deformation of up to 900%. Merely coating the elastomeric material would not be sufficient as few coatings can be stretched this far without cracking and sloughing off the elastomeric material. Submersing to equilibrium may also be advantageous in preventing a significant portion of the insecticide, insect repellant, or other agents from migrating to the external surface and drying, which would then also result in cracking and fall-off upon expansion of the elastomeric band for application.

With respect to the step of removing the band from the solution, this may be accomplished by physically removing the bands from the solution (e.g. withdrawing a basket containing the bands from the solution), by draining the solution from a container holding the bands in solution, or any combination thereof. In an embodiment, the solution is drained from a container holding bands by pumping the solution into a waste container or a recycling container. Indeed, in an embodiment, the solution may be re-used.

In the exemplary method of preparation described above, the bands are then removed from the solution and dried. The drying may be by air (i.e. air-dried), accomplished with moderate heating (e.g. in an oven), or any other suitable means. In an embodiment, the bands are air-dried by blowing sterile air through a container containing the bands. The step of drying causes the volatile solvent to evaporate, trapping the at least one or both of an insecticide and an insect repellant within the elastomeric material of the band. The evaporative drying process also brings a portion of the at least one or both of an insecticide and an insect repellent to the outer surface of the elastomeric band, where they remain as a coating on the band surface. This coating provides readily available at least one or both of an insecticide and an insect repellant for when the band is first applied to an animal, while higher concentrations of the at least one or both of an insecticide and an insect repellant reside deeper within the elastomeric material of the band and are capable of being released more slowly over time as the elastomeric band is affixed to the animal, thereby providing long-term insect control.

Thus, the exemplary methods of the present disclosure embeds the agents (e.g. the insecticide, insect repellent and/or active agent for the topical control of pain) within the elastomeric material of the elastomeric band, rather than simply coating them on its surface. This provides both a fast-acting release mode and a slow-releasing mode because the embedded agents must diffuse through the elastomeric material of the elastomeric band to be released. This is an advantageous feature of the elastomeric bands of the present disclosure in that they are capable of providing both fast-releasing active agent, which has been deposited on the elastomeric material surface as the solvent diffused to the surface and evaporated, and slower-releasing active agent that was trapped deeper within the elastomeric material as the solvent dried and caused the elastomeric material to shrink back to its original state.

In an embodiment, the present disclosure also relates to a method for a dual-mode insect control for an animal, the method comprising affixing to the animal an elastomeric band having infused or contained within one or both of an insecticide and an insect repellant, wherein said affixing provides: a fast-acting mode in which a first portion of the insecticide and/or insect repellant is delivered to a body surface of the animal and/or an environment in close proximity to the body surface, immediately upon affixing the elastomeric band to the animal; and a slow-releasing mode in which a second portion of the insecticide and/or insect repellant is delivered to the body surface of the animal and/or the environment in close proximity to the body surface, gradually over a period of time after continued affixation of the elastomeric band to the animal.

In an embodiment of the method for dual-mode insect control, the fast-acting mode provides a short-term delivery and effect of the insecticide and/or insect repellent to the body surface of the animal and/or the environment in close proximity to the body surface; and the slow-releasing mode provides a long-term delivery and effect of the insecticide and/or insect repellant to the body surface of the animal and/or the environment in close proximity to the body surface.

In embodiments of the methods herein where the control of pain is desired, the elastomeric band used in the methods for method for dual-mode insect control may further comprise an active agent for the topical control of pain.

As such, in another embodiment, the present disclosure relates to a method for a dual-mode insect control during castration, tail docking, umbilical cord ligation, or dehorning of an animal, the method comprising affixing to the animal an elastomeric band having infused or contained within an active agent for the topical control of pain and one or both of an insecticide and an insect repellant, wherein said affixing provides: a fast-acting mode in which a first portion of the active agent for the topical control of pain and the insecticide and/or insect repellent is delivered to a body surface of the animal and/or an environment in close proximity to the body surface, immediately upon affixing the elastomeric band to the animal; and a slow-releasing mode in which a second portion of the active agent for the topical control of pain and the insecticide and/or insect repellent is delivered to the body surface of the animal and/or the environment in close proximity to the body surface, gradually over a period of time after continued affixation of the elastomeric band to the animal.

In an embodiment of the methods for dual-mode insect control (and optionally pain control), the short-term delivery and effect is a duration of between about 0 seconds and about 24 hours. In an embodiment, the short-term delivery and effect is a duration of between about 30 seconds and about 6 hours. In an embodiment, the short-term delivery and effect is a duration of between about 1 minute and about 1 hour. In an embodiment, the short-term delivery and effect is provided by the insecticide, insect repellent and/or the other agents being on or near the outer surface of the elastomeric band. In an embodiment, the short-term delivery and effect is provided by the insecticide, insect repellant or the other agents being on the outer surface of the elastomeric band and/or within at least 0.1 mm, 0.2 mm, 0.3 mm, 0.4 mm, 0.5 mm, 0.6 mm, 0.7 mm, 0.8 mm, 0.9 mm or 1.0 mm from the exterior surface of the elastomeric band.

In an embodiment of the method for dual-mode insect control (and optionally pain control), the long-term delivery and effect is a duration of between about 24 hours and about 4 months. In an embodiment, the long-term delivery and effect is a duration of between about 6 hours and about 3 months. In an embodiment, the long-term delivery and effect is a duration of between about 1 hour and about 2 months. In an embodiment, the long-term delivery and effect is provided by the insecticide, insect repellent and/or the other active agents that are deeper within the elastomeric band. In an embodiment, the long-term delivery and effect is provided by insecticide, insect repellent or the other agents being at least 1.0 mm, 1.5 mm, 2.0 mm, 2.5 mm, 3.0 mm, 3.5 mm, 4.0 mm, 4.5 mm, 5.0 mm or more within the elastomeric band.

As used herein, by "close proximity" it is meant that the insecticide, insect repellent or other agents are released from the elastomeric material into the environment up to a distance of about 1 meter, more preferably about 0.5 meter, more preferably again about 1 foot, and more preferably still about 0.5 foot. In relation to systemic delivery or travel, an advantageous finding herein is that the insecticide and/or insect repellant did not transfer systemically. Demonstrating equivalent, targeted efficacy while demonstrating that the insecticide/repellant does not have systemic distribution is a surprising and advantageous result. In this context, referring to passage and/or absorption through body tissues of the animal, by "close proximity" it is meant up to a distance of about 25 cm, more preferably about 20 cm, more preferably again about 10 cm, and more preferably still about 5 cm. The close proximity release of the insecticide, insect repellant, or other agents allows for lows amounts or concentrations of active agent to be used, which has environmental advantages. As used herein, the term "releasably delivers" refers to the diffusion or elution of the insecticide, insect repellent, or other agents out of the elastomeric band into the surrounding environment, including skin, open wound or air. In an embodiment, this may occur through airborne volatile particles.

As used herein, the terms "open wound" or "wound site" refers to any damaged, exposed, infected, infested, cancerous or diseased surface of the animal or animal part. In an embodiment, the open wound or wound site comprises a wound from castration, tail docking, de-antlering, umbilical cord ligation, dehorning, or the like. In a particular embodiment, the open wound or wound site comprises myiasis, an abscess, mange, an open wound, the like, or any combination thereof. In an exemplary embodiment, the open wound or wound site comprises myiasis. In an embodiment, the open wound or wound site exposes blood of the animal to the external environment.

In select embodiments of the present disclosure, the elastomeric band further comprises one or more antimicrobial agents; one or more antibiotics; one or more anti-inflammatory agents; one or more hormones; one or more chemical indicators; one or more vasoconstrictor agents; or any combination thereof.

As used herein, an antimicrobial agent is any natural or synthetic substance that is capable of killing or inhibiting the growth of microorganisms (i.e. bacteria, virus, fungi, parasite, and algae). Particularly suitable are antimicrobial agents capable of functioning by topical application. Non-limiting examples of antimicrobial agents include penicillin, valacyclorvir, fluconazole, praziquantel, ethanol, n-propanol, lidocaine, and isopropyl alcohol.

As used herein, an antibiotic is any natural or synthetic substance that is capable of killing or inhibiting the growth of bacteria. Thus, an antibiotic falls within the scope of an antimicrobial agent. Particularly suitable are antibiotics capable of functioning by topical application. Non-limiting examples of antibiotics include amoxicillin, doxycycline, cephalexin, ciprofloxacin, clindamycin, metronidazole, azithromycin, sulfamethoxazole, trimethoprim, clavulanate, levofloxacin, and lidocaine.

As used herein, an anti-inflammatory agent is any natural or synthetic substance that is capable of preventing or reducing inflammation. Anti-inflammatory agents include but are not limited to non-steroidal anti-inflammatory drugs (NSAIDs) such as meloxicam, flunixin, ketoprofen, diclofenac, and ibuprofen. Steroidal anti-inflammatory agents include but are not limited to dexamethasone, flumethasone, prednisolone, prednisone, and immune selective anti-inflammatory derivatives (IMSAIDs). As will be appreciated, many anti-inflammatory agents are also capable of relieving pain (e.g. NSAIDS) and thus may be included in an elastomeric band of the present disclosure as an active agent for the topical control of pain, or in combination therewith. In a particular embodiment of the present disclosure, the anti-inflammatory agent is lidocaine.

As used herein, a hormone is a signalling molecule capable of regulating biological processes, such as in multicellular organisms. Some embodiments of the elastomeric band disclosed herein include one or more hormones. Hormones include but are not limited to: cortisone, hydrocortisone, trenbolone, testosterone, and estradiol.

As used herein, a vasoconstrictive agent is any natural or synthetic substance that is capable of causing the constriction of blood vessels. Some embodiments of the elastomeric band disclosed herein may include a vasoconstrictive agent, such as epinephrine, pseudoephedrine, phenylephrine, thromboxane, angiotensin, or any combination thereof.

Some embodiments of the elastomeric band disclosed herein may also include one or more chemical indicators, such as dyes, pigments, pH indicators or stains, for example to differentiate the elastomeric band as containing active agent(s). These chemical indicators could also release with the active agent for the topical control of pain, the insecticide and/or the insect repellant to provide visual evidence of release to the area of application. In some cases, the chemical indicator may also be an active agent. Examples include, but are not limited, to the use of antimicrobial dyes such as gentian violet, which stains the area a blue-purple color and also acts as a topical antimicrobial agent that helps prevent infection at the site of elastration. In other examples the chemical indicator may include the use of pH indicators to identify alkaline pH, which is correlated with infection. Examples of other chemical indicators that could be incorporated into the elastomeric band of the present disclosure include, but are not limited to, Nile Red, Oil Red, Sudan Red, Congo Red, cresol red, Coomassie Red, Coomassie Blue, methylene blue, Oil Blue, gentian violet, Azure blue, Malachite green, Eosin dyes, Rhodamine dyes, haematolxylin, phenolphthalein, phenol red, methyl red, bromothymol blue, thymol blue, Alizarine yellow, povidone iodine, and natural dyes such as indigo, turmeric, *Catechu* and Annato extract. In a particular embodiment, the chemical indicator is resazurin which reduces to resorufin in the presence of bacteria.

In some embodiments, the present disclosure provides an elastomeric band prepared by the methods disclosed herein. The elastomeric band provided by the methods disclosed herein may be used for any suitable application. In some embodiments, the elastomeric band is for use as a system for castration, tail docking, de-antlering, umbilical cord ligation, dehorning, or the like, with concurrent insect control. In a particular embodiment, the elastomeric band is for use as a system of castration, tail docking, umbilical cord ligation, or dehorning.

In some embodiments, an open wound or a wound site will result from the use of the elastomeric band as a system of castration, tail docking, umbilical cord ligation, or dehorning. In some embodiments, the elastomeric band is used for castration, tail docking, umbilical cord ligation, or dehorning of an animal with concurrent insect control. In some embodiments, the elastomeric band is used for controlling myiasis in an animal during castration, tail docking, umbilical cord ligation, or dehorning of the animal. In an embodiment of some disclosures, the elastomeric band is used for treating or preventing flystrike in an animal during castration, tail docking, umbilical cord ligation, or dehorning of the animal.

In an embodiment of some disclosures, the elastomeric band is used for protecting an animal from insects during castration, tail docking, umbilical cord ligation, or dehorning of the animal.

In an embodiment, the elastomeric material of the elastomeric band herein may be of different sized bands in order to perform ligation on different body parts, sizes, types, ages, etc. of animals. A band may also be sized or configured for use with a particular applicator and device. Various devices known in the art employ an endless loop band. Although endless loop bands may accommodate various different size animals and parts, they may present a risk of applying excessive or inadequate tension.

An elastomeric band of the present invention may be adjustable or adjusted to fit the size and/or shape of the subject animal. The band may be formed into a loop using a fastener or crimp. In some embodiments, the size may be adjusted using a constrictor or the like.

The present disclosure further contemplates the use of different sized bands. For example, a band is provided that is suitable for ligation of small animals, such as infant calves or sheep. A band of similar design is further provided for a medium sized animal, such as a more developed calf. This medium sized band is larger in initial circumference and/or has a higher elastic force. Bands may also be provided for larger animals, such as grown bulls. These bands may be further color coded and/or labeled so as to readily provide information to a user and reduce the risk of using an improperly sized band, which could result in a failed ligation.

Another aspect of the present invention involves a method for ligating a body part of an animal, preferably a tail, scrotum, antler, or horn. In select embodiments, the elastomeric band may be expanded over the body part and released. In some of these embodiments, no tool is required to attach the elastomeric band to the body part. In other of these embodiments, the elastomeric band is expanded with a tool before applying over a body part.

Another method involves manually passing a preformed endless loop of the elastomeric band around the body part of the animal. The endless loop is then pulled using various means integral to a ligature tool (e.g. winding mechanisms, pulling mechanisms, etc.) to tighten the loop around the animal's body part. Once the endless loop is sufficiently tightened, it is secured to maintain adequate pressure around the animal's scrotum. Preferably, the step of securing comprises deforming a grommet or other crimping device around the endless loop, while the pulling of the endless loop is accomplished by winding the endless loop around a winding spool integrally attached to the ligature tool. To improve the efficiency and cost of the method, a winding tether and attached hook may be utilized to reduce the overall length of ligature material necessary. After the grommet is deformed around the endless loop to secure the portion of the loop surrounding the body part, the excess ligature material above the grommet may be removed by cutting the part of the loop that is not around the body part with a sharp knife, razor blade or other suitable instrument. Alternatively, the band material can be unwound or otherwise released from the tool, thus eliminating the need to cut the band so as to release it from the tool.

Some embodiments of the invention also include two ends of predetermined length of the elastomeric material disposed substantially parallel to each other, and an anchor member or tang portion that is secured to the two ends of the elastomeric material of predetermined length, which is used by the ligature tool to tighten the loop around the animal's body part. In such embodiments, a crimping band is also provided, the crimping band being translatable along at least a portion of the length of a band in an un-crimped state. After the loop is tightened around the body part, the band is crimped to hold the two ends of the loop in place and the excess material may be trimmed from the attached loop. In some embodiments, the excess material area may be deliberately not infused with active agents (i.e. through a dipping process). This will have the advantage of not wasting active agent and allowing for improved handling of the embodiment such that the human user's skin will not come in contact with the active agents.

One skilled in the art will recognize that an elastomeric band of the present invention may be incorporated into a system or kit according to the present disclosure.

This present disclosure is in the general field of methods and apparatus for non-surgical removal of animal tails, horns, testicles, and the like. It is further directed to the foregoing mentioned field wherein a resilient ring of rubber, or the like, is formed, having a very small opening but being expandable to slip over the portion of the animal to be non-surgically removed and then released onto such member so as to completely cut-off the flow of blood from the main portion of the animal to the member, at the same time pulling the skin adjacent the animal into a configuration such that the skin covers the area from which the member was removed. The present disclosure is even further directed to the non-surgical removal of tails from swine by expanding the elastomeric band in a unique triangular configuration by utilization of a unique ring expanding tool and applying the ring around the tail of the swine and removing the ring from the expanding tool.

EXAMPLES

Example 1

Exemplary elastomeric bands of the present application were prepared in both small band format and large band format. For the small bands, insecticide was infused into the entirety of the band for non-selective, total device infusion. For the large bands, insecticide was infused into only a portion of the band for selective, targeted infusion.

Figure 2:
FIG. 2 is a photograph showing an exemplary method of manufacture of elastomeric bands (small) of the present disclosure, where the bands are submersed entirely within the solution containing active ingredient (e.g. insecticide and/or insect repellant, with or without an agent for topical control of pain).

Generally, elastomeric bands of the desired size (small and large) were obtained. Small bands were submersed in their entirety in a solution containing an insecticide (see FIG. 2). This was performed separately for various different insecticides, including ivermectin, imidacloprid, and spinosad. This was also performed using solutions that include both insecticide and an active agent for the topical control of pain, including ivermectin+lidocaine, imidacloprid+lidocaine, and spinosad+lidocaine. Small bands that include these insecticides with and without the active agent for the topical control of pain were used in other examples as described herein.

Figure 3:
FIG. 3 is a photograph showing an exemplary method of manufacture of elastomeric bands (large) of the present disclosure, where the bands are only partially submersed within the solution containing active ingredient (e.g. insecticide and/or insect repellant, with or without an agent for topical control of pain).
Figure 4:
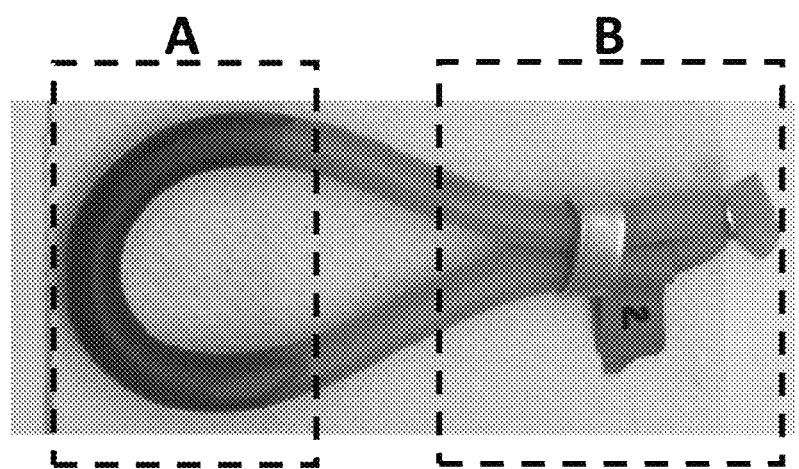
FIG. 4 is a photograph showing the band as prepared in FIG. 3, where a portion of the has the active ingredients and represents a defined and selective region or zone of active ingredient (Box A: green/darker region) and a different portion of the band represents a region or zone that is substantially free of active ingredient (Box B: natural band region without colour).

Large bands were prepared by submersing only a portion of the band in a solution containing an insecticide (see FIG. 3). A green dye was included in the solution to visually observe the localized infusion of the solution into the band. As shown in FIG. 4, submersing only a portion of the large band in the solution was effective in providing a band with a defined and selective region or zone of active agent (Box A: green/darker region in the photo of FIG. 4). Advantageously, the manufacture of bands in this manner provides a region or zone that is free of active agent that may be used for safe handling of the bands (Box B: natural band region without colour in the photo of FIG. 4). This is not only advantageous in respect of ease of handling, but also reduces waste since rubber gloves to not need to be worn when handling the bands.

Figure 5:
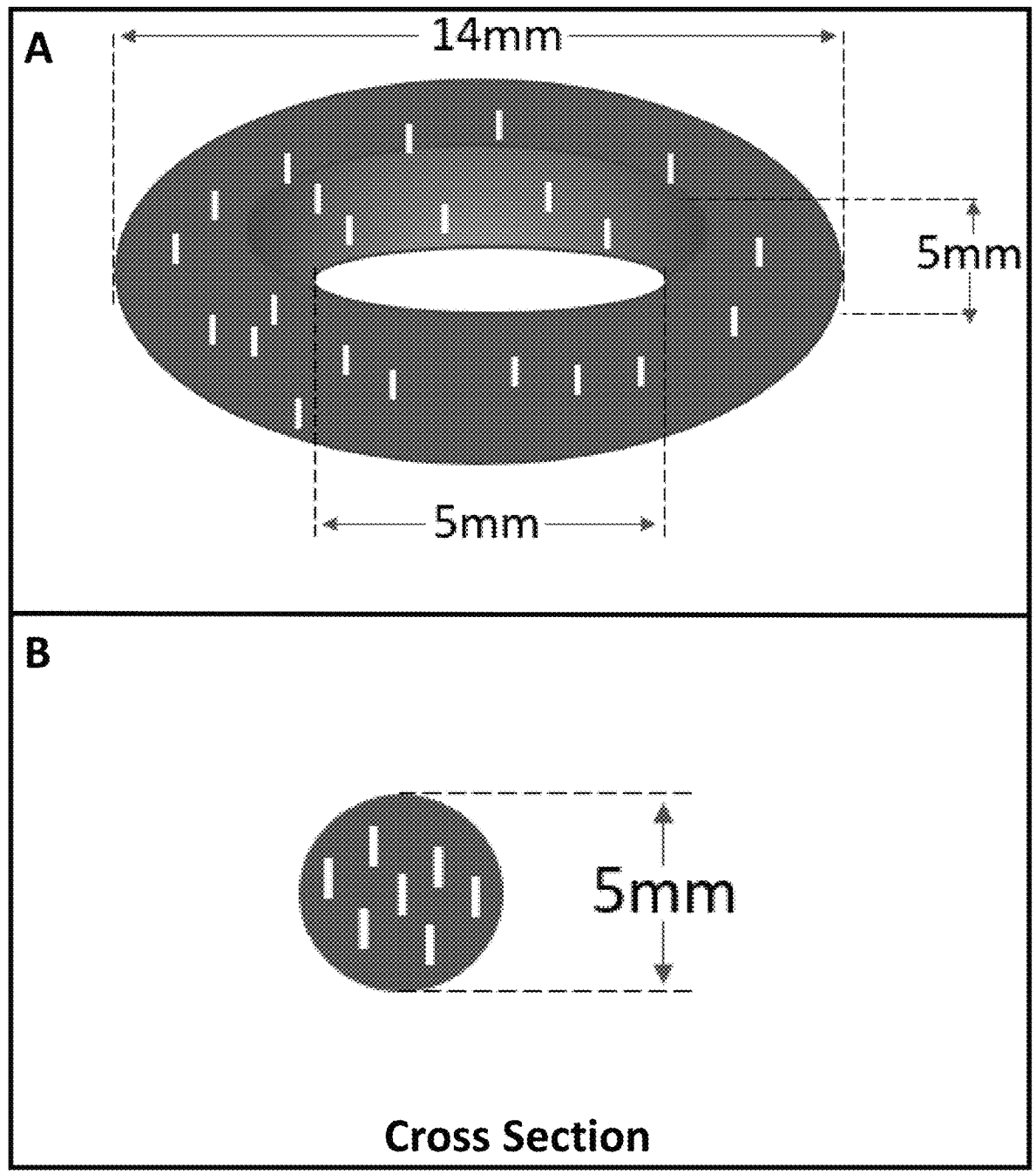
FIG. 5 is a graphic representation of the distribution of insecticide throughout a band as prepared in FIG. 2 (Insecticide="I"). The insecticide is infused and dispersed throughout the band.
Figure 6:
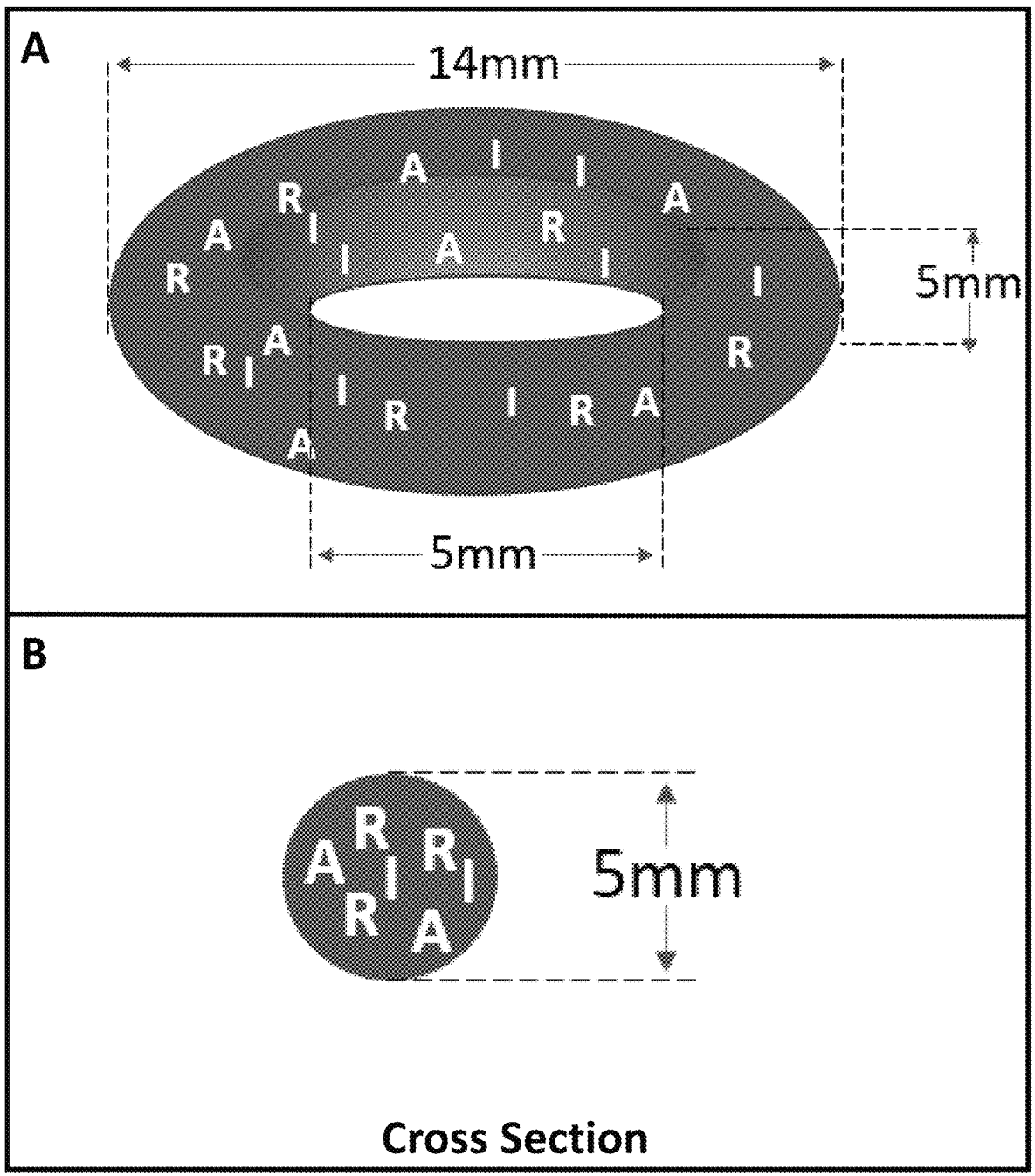
FIG. 6 is a graphic representation of the distribution of insecticide, insect repellent and an active agent for the topical control of pain throughout a band as prepared in FIG. 2 (Insecticide="I"; Insect Repellent="R"; and Active Agent for the Topical Control of Pain="A"). The insecticide, insect repellant and an active agent for the topical control of pain are each infused and dispersed throughout the band.

For the small bands, FIG. 5 shows a graphic representation of the distribution of insecticide throughout the band (Insecticide="I"). The insecticide is infused and dispersed throughout the band. For the small bands, FIG. 6 shows a graphic representation of the distribution of insecticide, insect repellent and an active agent for the topical control of pain throughout the band (Insecticide="I"; Insect Repellent="R"; and Active Agent for the Topical Control of Pain="A"). All of the active ingredients (I, R and A) are infused and dispersed throughout the band. Notably, bands containing different active ingredients, or combinations thereof, may can be colour-coded by using band materials of different colour (e.g. orange, green, blue, black, yellow, etc.).

Example 2

Determination of anti-myiasis activity by elastomeric bands loaded/infused with insecticide, with or without an active agent for the topical treatment of pain, was studied by Maggot Inhibitory Assay (MIA).

Experimental Test Matrix:

Nine (9) Test and Control Articles: "Mock Processed" Control Band (CON), "Off-The-Shelf" Master Control Band (OTS), Ivermectin Only Band (Iver), Lidocaine+Ivermectin Band (Iver-LLB), Lidocaine Only Band (LLB), Imidacloprid Only Band (IMI), Lidocaine+Imidacloprid Band (IMI-LLB), Spinosad Only Band (Spin), Lidocaine+Spinosad Band (Spin-LLB). The elastomeric bands were prepared by submersing the entire band in a solution containing the specified active ingredients.

One (1) test organism: *Hermetia illucens* larvae, "medium size" 3rd instar feeding (crop-full), mean weight 45-60 mg).

Triplicate (n=3): Total=27 individual sample assays.

Objective of the Study:

The purpose of this study was to determine the response of *Hermetia illucens* to the insecticide loaded elastomeric bands having the listed insecticides, with or without lidocaine.

A secondary goal of the study was to develop a novel MIA.

Sample Description:

A list of the samples used in the experiment are described in Table 1, below. For each sample, a 4.3 cm circumference, 0.5 g, white elastomer band was used. The active ingredients were added to the bands by submersing the entire bands in a solution containing the active ingredients.

TABLE 1

| Description of Samples | | |
|---|---|---|
| CODE | Sample ID | Description |
| LLB | LLB-1<br>LLB-2<br>LLB-3 | Contains about 78 mg of lidocaine per band. |

TABLE 1-continued

Description of Samples

| CODE | Sample ID | Description |
|---|---|---|
| Iver | I-1<br>I-2<br>I-3 | Contains about 50-100 mg of Ivermectin per band. |
| Iver-LLB | I-LLB-1<br>I-LLB-2<br>I-LLB-3 | Contains about 50-100 mg of Ivermectin per band and about 78 mg of lidocaine per band. |
| IMI | IMI-1<br>IMI-2<br>IMI-3 | Contains about 50-100 mg of Imidacloprid per band. |
| IMI-LLB | IMI-LLB-1<br>IMI-LLB-2<br>IMI-LLB-3 | Contains about 50-100 mg of Imidacloprid per band and about 78 mg of lidocaine per band. |
| Spin | Spin-1<br>Spin-2<br>Spin-3 | Contains about 50-100 mg of Spinosad per band. |
| Spin-LLB | S-LLB-1<br>S-LLB-2<br>S-LLB-3 | Contains about 50-100 mg of Spinosad per band and about 78 mg of lidocaine per band |
| CON | CON-1<br>CON-2<br>CON-3 | "Mock processed" (i.e., same as LLB but was prepared in a solution that lacks any of the listed active ingredients) |
| OTS | OTS-1<br>OTS-2<br>OTS-3 | Totally unprocessed band (master control) i.e. not subjected to solution. Same lot used in band manufacture. |

Contact Time: 7 Days

Contact Temperature: 30±2° C.

Figure 7:
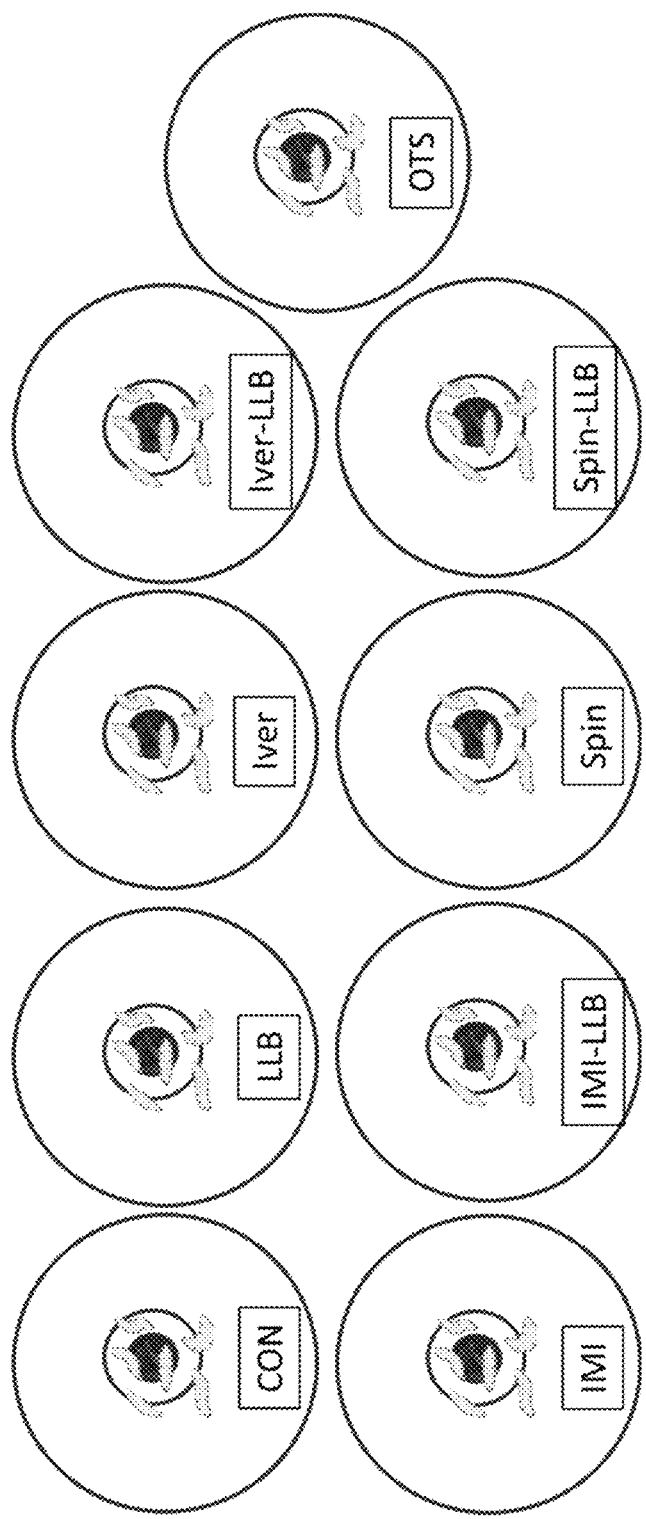
FIG. 7 shows a diagrammatic overview of the protocol of Example 2. The figure represents 1 replicate. Codes are described in Table 1. The figure shows white elastrator bands with feed in center overlaid with maggots in a circular petri dish.

Test Method Overview: See FIG. 7 for Diagrammatic Overview.

Fresh wet chicken feed (WCF) and *Hermetia illucens* larvae (3rd instar feeding (crop-full), mean weight 45-60 mg) were obtained within 48 hours of the start of the testing. A small (60 mm diameter) petri dish served as the test container for each replicate. The fresh WCF was manually pressed into the center hole of each band so that the band was over filled with the fresh WCF. Each test and control article were placed in an individual 60 mm petri dish. Five (5) larvae were placed on each test and control article. The lid was placed on the petri dish and the dish was wrapped in parafilm (parafilm is permeable to oxygen at 23° C.≤350 cm³/m2). The test and control dishes were kept in an incubator at temperature (~30° C.) in the dark. Larvae were observed daily for up to two (2) weeks, noting motility and pupation.

Test Article Preparation:

*Hermetia illucens* larvae (3rd instar feeding (crop-full), mean weight 45-60 mg) were obtained within 48 hours of the start of the testing. Fresh WCF was prepared before the test. Equal weight of chicken feed to water w/w was mixed to prepare the WCF. The amount prepared was enough for 1.0 g per assay (total WCF weight per band) for a total of 50 g.

Small (60 mm diameter) petri dish was used as the test container for each replicate.

An about 50 mm Whatman filter paper (90 mm, Cat no. 1001-090) was cut, wetted with 1000 μL distilled water and placed in the petri dish.

Test and control bands had about 1.09 g of fresh WCF manually pressed into the center hole such that the band was filled to overfill with WCF. The weight of the WCF was recorded.

Conduct of the Test:

Each test and control article were prepared in the individual 60 mm petri dish in triplicates, as described. Five (5) larvae were weighed as a group and recorded for each test and control article. The lid was placed on the petri dish and this was wrapped in parafilm, as described. The test and control containers were kept at temperature ~30° C. in the dark. Larvae were observed daily for up to two weeks, noting motility and pupation.

The weight of the 5 larvae in each assay replicate were determined and recorded by: (a) removing the lid from the base and placing on the scale; and (b) taring the scale and gently placing the 5 larvae into the lid and recording the total weight.

Results

Figure 8:
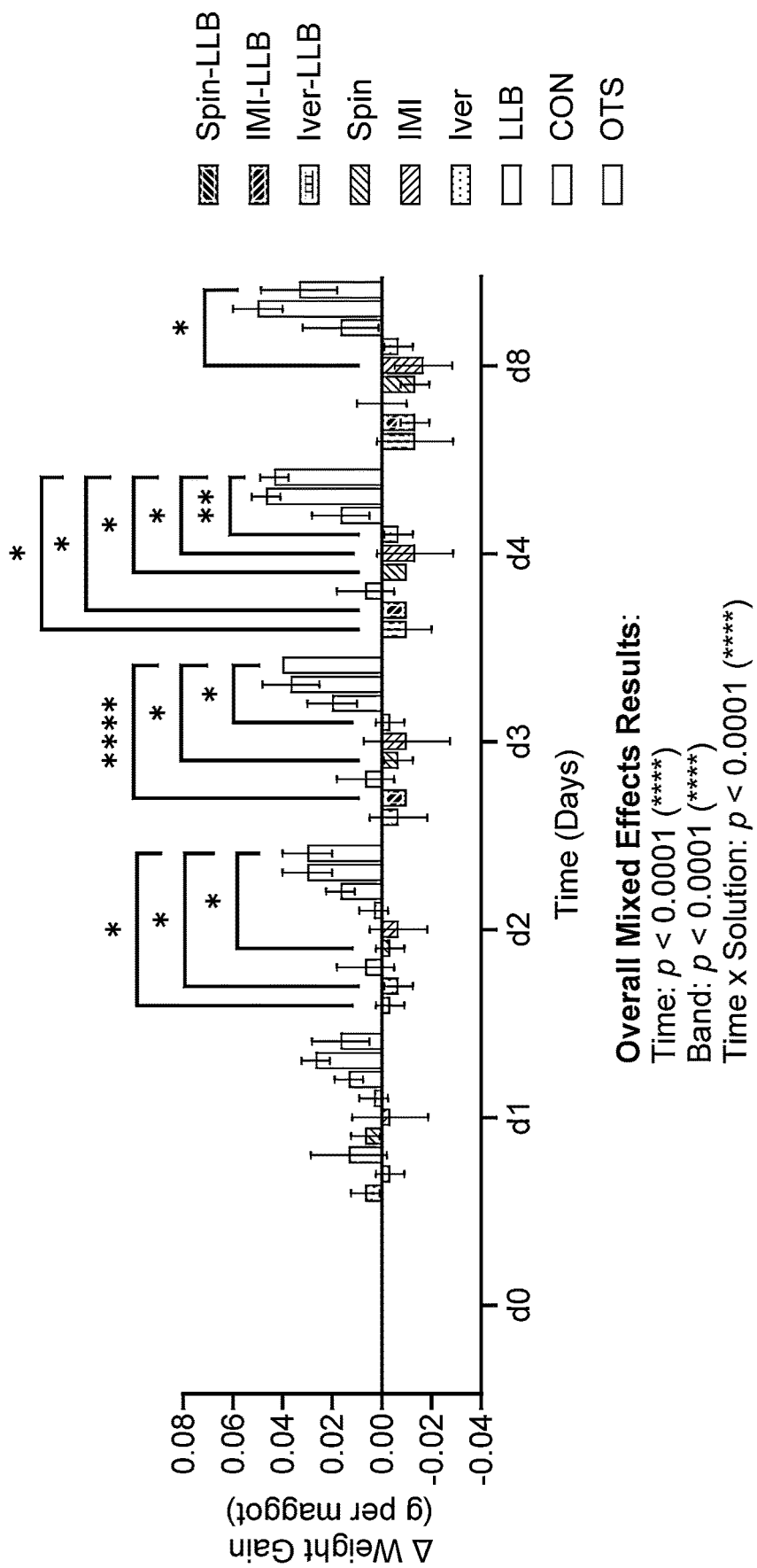
FIG. 8 is a graph showing the weight gain per maggot over time in respect of the experiment in Example 2.
Figure 9:
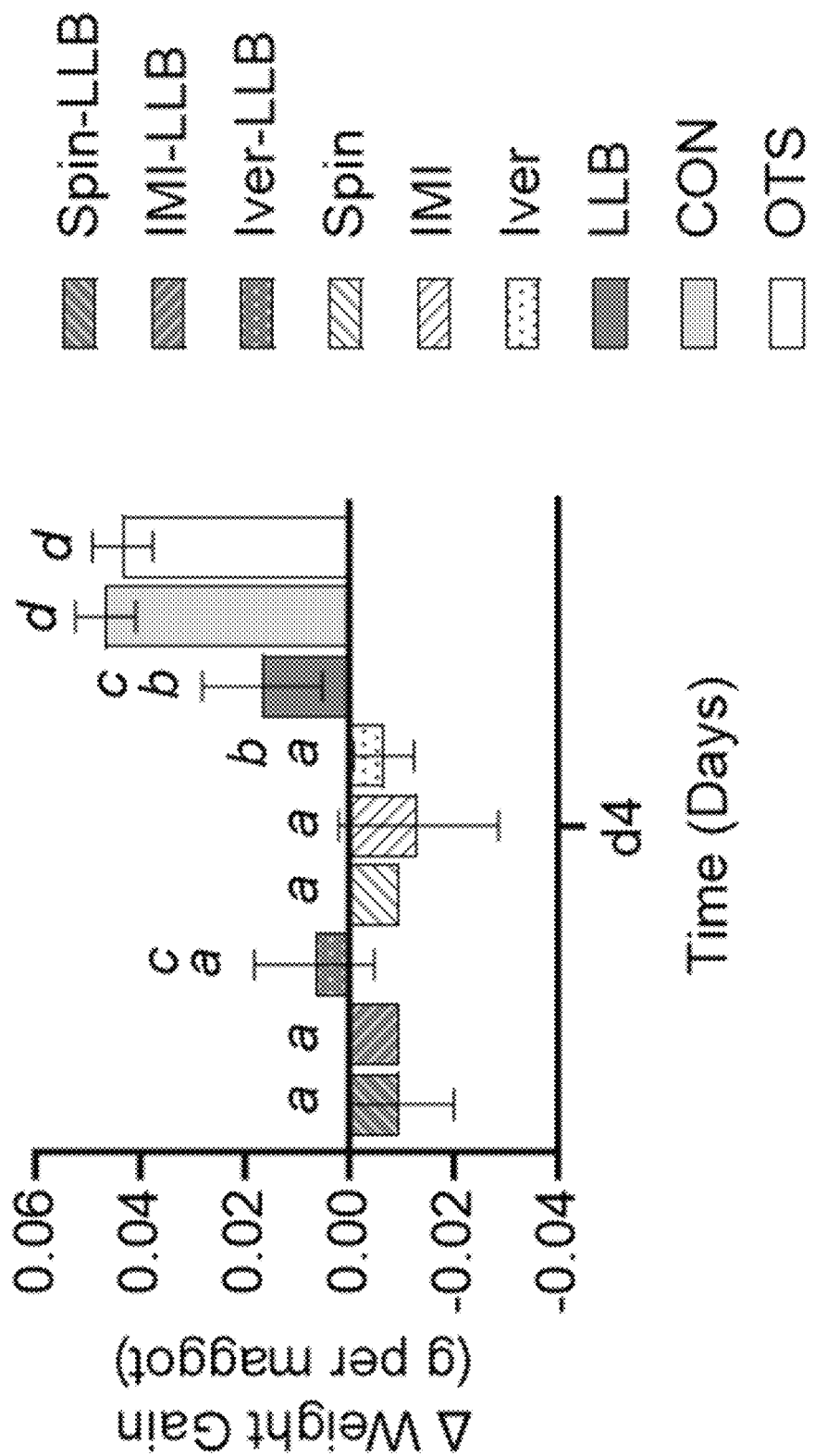
FIG. 9 is an enlarged view of the day 4 results shown in the graph of FIG. 8.

The results are shown in FIG. 8 as weight gain per maggot over time. At time 0, 5 maggots were placed into each of 3 pre-weighed petri dishes with food plus the identified test bands: OTS, CON, LLB, Iver, Iver-LLB, IMI, IMI-LLB, Spin, or Spin-LLB. At each indicated time point, the weight of maggots was recorded and divided by the number of maggots per dish to calculate the weight per maggot. The weight per maggot at time 0 was then subtracted from the measured weight at each time point to calculate the weight gain per maggot. The complete time course is shown in FIG. 8, while only the data from day 4 is shown in FIG. 9. Bars represent the mean±standard deviation of 3 replicate petri dishes. In FIG. 8, statistical significance for each band, relative to the OTS control, was determined using a repeated measures mixed effects model and each petri dish as the experimental unit (fixed effects were time, band, and time× band interaction; random effects were individual petri dishes and residuals); p-values were corrected for multiple comparisons with Dunnett's test. *, $p<0.05$; , $p<0.01$; *, $p<0.001$; ****, $p<0.0001$. In FIG. 9, a one-way ANOVA was used with Tukey's correction for multiple comparisons; data marked with the same letter (i.e. a, b, c, or d) were not significantly different from one another (i.e., $p≥0.05$).

Conclusions

All insecticide loaded elastomeric bands were able to produce an effective insecticide or repellant activity as demonstrated by weight loss and maggot death when any insecticide (Ivermectin, Imidacloprid, Spinosad) was infused into the elastomeric band on its own. See FIGS. 8 and 9.

All insecticide loaded elastomeric bands were also able to produce an effective insecticide or repellant activity when used in combination with lidocaine, as demonstrated by weight loss and maggot death when any insecticide (Ivermectin, Imidacloprid, Spinosad) was infused into the elastomeric band in the presence of lidocaine. See FIGS. 8 and 9.

The lidocaine elastomeric band on its own was also able to produce an effective insecticide or repellant activity as demonstrated by weight loss and maggot death when no insecticide (ivermectin, imidacloprid, or spinosad) was included in the band. This is a surprising result and as shown at least in the day 4 data, was statistically significant.

Mock treated (bands soaked in a solution containing tetrahydrofuran and isopropyl myristate, without lidocaine or an insecticide) and the off-the-shelf bands demonstrated no insecticide or repellant activity. See FIGS. 8 and 9.

Example 3

Determination of anti-myiasis activity by solutions of insecticide, or a lidocaine solution, was studied by Maggot Inhibitory Assay (MIA).

Experimental Test Matrix:

Seven (7) Test and Control Articles: Wet chicken feed (positive control), Tetrahydrafuran infused feed (THF; carrier control), Isopropyl Myristate infused feed (IPM; permeation enhancer control), Lidocaine solution infused feed (LD), Ivermectin infused feed (Iver), Imidacloprid infused feed (IMI), Spinosad infused feed (Spin).

One (1) test organism: *Hermetia illucens* larvae, "medium size" 3rd instar feeding (crop-full), mean weight 45-60 mg.

Triplicate (n=3): Total=21 individual sample assays.

Objective of the Study:

The purpose of this study was to determine the response of *Hermetia illucens* to the solutions of the listed components, and to compare the effects of insecticide infused into an elastomeric band (Example 2) to insecticides in liquid form. It was anticipated that the liquid insecticide soaked into maggot feed will provide a superior insecticide effect compared to an insecticide infused within an elastomeric matrix, particularly in respect of an immediate (short-term) effect. Equivalent or enhanced insecticide effects using an elastomeric band would be surprising.

A secondary goal of this study is to investigate the study design in regards to verifying a distinct responding variable of larvae weight for the investigational organism *Hermetia illucens*. This is to develop a novel MIA.

Sample Description:

A list of the samples used in the experiment are described in Table 2, below.

TABLE 2

Description of Samples

| CODE | Sample ID | Description |
|---|---|---|
| Spin | Spin-1<br>Spin-2<br>Spin-3 | 1.25 g of spinosad into 3.58g THF |
| IMI | IMI-1<br>IMI-2<br>IMI-3 | 2.4 g into 7.1 g THF |
| Iver | Iver-1<br>Iver-2<br>Iver-3 | 1.25 g into 2.33g THF |
| LD | LD-1<br>LD-2<br>LD-3 | 1.25 g into 2.33g THF |
| IPM | IPM-1<br>IPM-2<br>IPM-3 | Neat |
| THF | THF-1<br>THF-2<br>THF-3 | Neat |
| POS | POS-1<br>POS-2<br>POS-3 | WCF alone |

Contact Time: 7 Days

Contact Temperature: 30±2° C.

Figure 10:
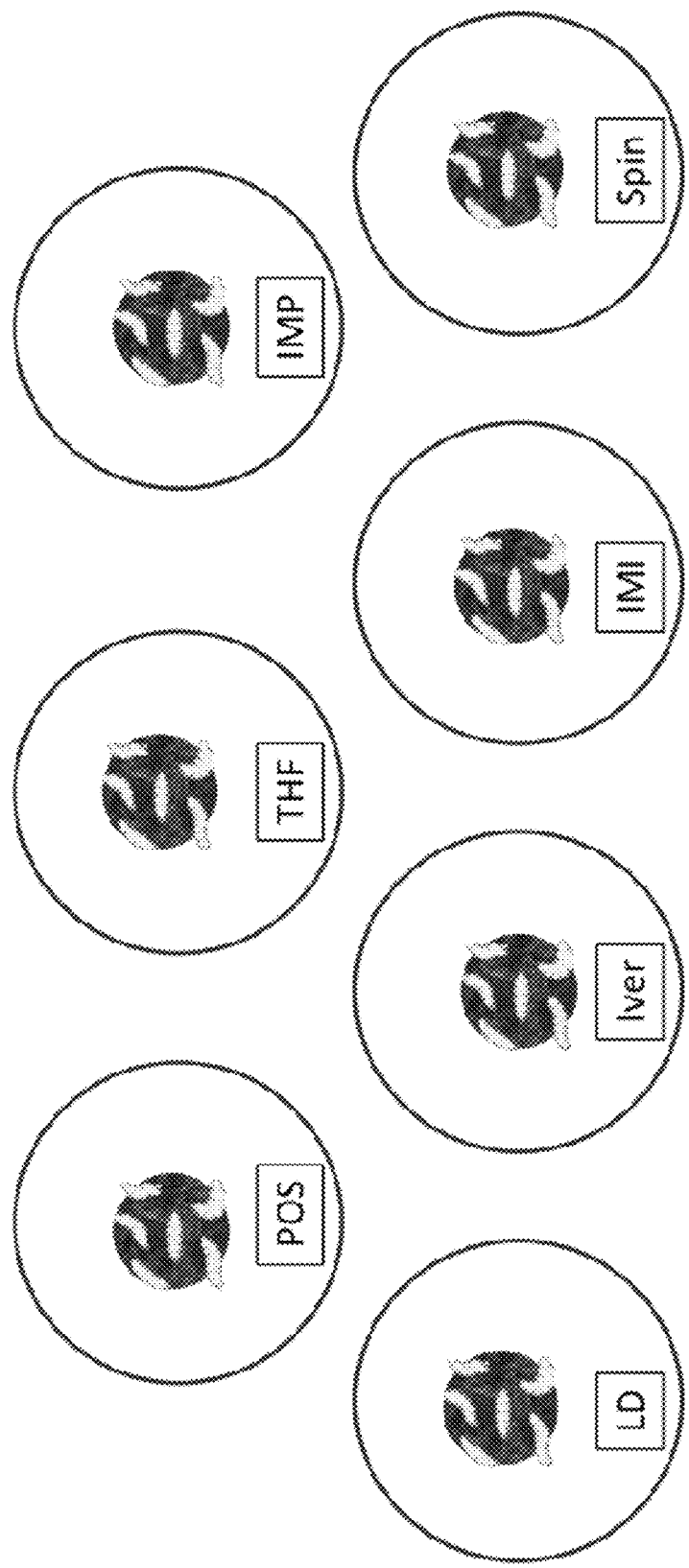
FIG. 10 shows a diagrammatic overview of the protocol of Example 3. The figure represents 1 replicate. Codes are described in Table 2. The figure shows feed in the center overlaid with maggots in a circular petri dish.

Test Method Overview: See FIG. 10 for Diagrammatic Overview.

Fresh wet chicken feed (WCF) and *Hermetia illucens* larvae (3rd instar feeding (crop-full) mean weight 45-60 mg) were obtained within 48 hours of the start of the testing. A small (60 mm diameter) petri dish served as the test container for each replicate. Solutions of the test substances were added onto the fresh WCF, and then the WCF with solution was placed into the center of the container and weighed. The POS control utilized an approximately similar-sized sample of fresh WCF, without any solution being added. Five (5) larvae were placed on each test and control article infused the fresh WCF. The lid was placed on the petri dish and the dish was wrapped in parafilm. The test and control containers were kept in an incubator at ~30° C. temperature, in the dark. Larvae were observed daily for up to two (2) weeks, noting motility and pupation.

Test Article Preparation:

*Hermetia illucens* larvae (3rd instar feeding (crop-full) mean weight 45-60 mg were obtained within 48 hours of the start of the testing. Fresh WCF was prepared 72 hours before the test so that THF had a chance to evaporate out. Equal weight of chicken feed to water w/w was mixed to prepare the WCF. The amount prepared was enough for 2.0 g per assay (total WCF weight per band) for a total of 100 g. The fresh WCF was added to seven (7) separate and labelled beakers (10 g WCF/beaker). For the positive control, the WCF beaker was wrapped with parafilm on top and stored in a fridge. For the other samples, 1000 μL of each sample solution was added to the appropriately labelled beaker with the portion of WCF. A portion of the solution was retained in a sealed glass vial for possible QA/QC. The WCF sample with solution added was mixed thoroughly and left in a fume hood for up to 72 hours to let THE evaporate off.

Small (60 mm diameter) petri dishes were used as the test container for each replicate.

An about 50 mm diameter disc of Whatman filter paper (90 mm, Cat no. 1001-090) was cut, wetted with 1000 μL distilled water and placed in the petri dish.

Test and control containers had about 2.0 g of test solution infused WCF placed into the center of the wetted filter paper.

Conduct of the Test:

Each test and control article were prepared in the individual 60 mm petri dishes in triplicate as described, >48 hours before study start. Five (5) larvae were weighed as a group and recorded for each test and control article. The lid was placed on the petri fish and this was wrapped in parafilm, as described. The test and control containers were kept in the incubator at temperature ~30° C. in the dark. Larvae are observed daily up to two weeks, noting observations on food consumption, weight and pupation.

The weight of the 5 larvae in each assay replicate were determined and recorded by: (a) removing the lid and weighing the container without the lid (larvae+WCF+container); and (b) taring the scale and gently placing the 5 larvae into the lid and recording the total weight.

Results

Figure 11:
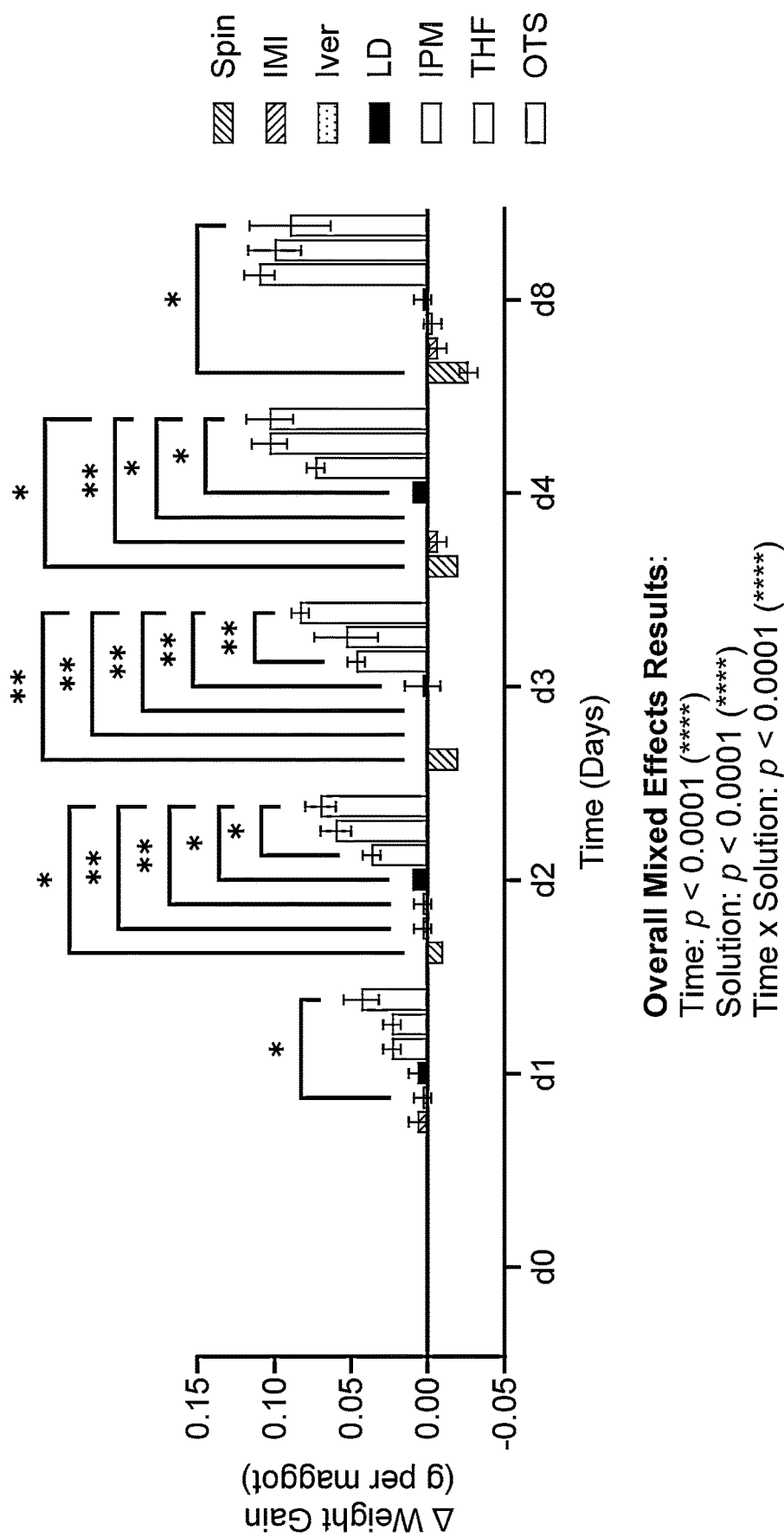
FIG. 11 is a graph showing the weight gain per maggot over time in respect of the experiment in Example 3.
Figure 12:
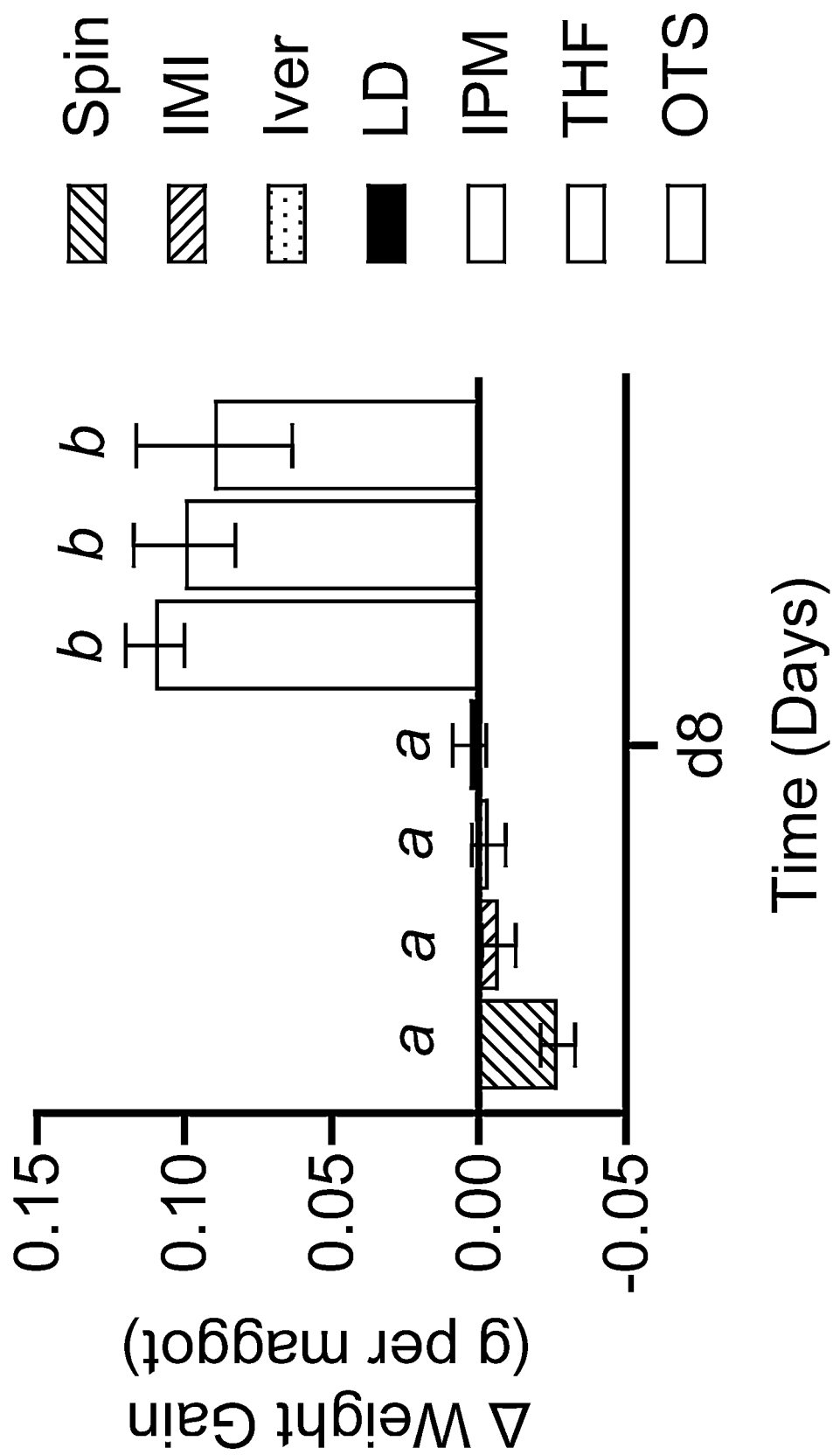
FIG. 12 is an enlarged view of the day 8 results shown in the graph of FIG. 11.

The results are shown in FIG. 11 as weight gain per maggot over time. At time 0, 5 maggots were placed into each of 3 pre-weighed petri dishes WCF mixed with the following, as described: nothing (OTS), Tetrahydrofuran (THF), Isopropyl Myristate (IPM), Lidocaine (LD), Ivermectin (Iver), Imidacloprid (IMI), or Spinosad (Spin). At each indicated time point, the weight of maggots was recorded and divided by the number of maggots per dish to calculate the weight per maggot. The weight per maggot at time 0 was then subtracted from that at each time point to calculate the weight gain per maggot. The complete time course is shown in FIG. 11, while only the data from day 8 is shown in FIG. 12. Bars represent the mean±standard deviation of 3 replicate petri dishes. In FIG. 11, statistical significance for each solution, relative to the OTS control, was determined using a repeated measures mixed effects model and each petri dish as the experimental unit (fixed effects were time, solution, and time×solution interaction; random effects were individual petri dishes and residuals); p-values were corrected for multiple comparisons with Dunnett's test. *, $p<0.05$; , $p<0.01$; *, $p<0.001$; ****, $p<0.0001$. In FIG. 12, a one-way ANOVA was used with Tukey's correction for multiple comparisons; data marked with the same letter were not significantly different from one another (i.e., $p \geq 0.05$).

Conclusions

All insecticides tested were able to produce an effective insecticide or repellant activity as demonstrated by weight loss and maggot death when any insecticide (ivermectin, imidacloprid, spinosad). This demonstrated the function of the assay. Comparing to Example 2, it was found that when the insecticide is infused into the elastomeric band it has an equivalent function to the insecticide on its own. This is a surprising result. It was anticipated that the insecticide in liquid form soaked into the feed would be more effective than when it is contained in the band. For example, it was surprising that the insecticides were able to elute from the elastomeric band at all, let alone so quickly, to achieve the insecticide or repellant effect. This demonstrates their effectiveness in the fast-acting mode as described herein. See FIGS. 8 and 9 compared to FIGS. 11 and 12.

The lidocaine solution on its own was able to produce an effective insecticide or repellant activity as demonstrated by weight loss and maggot death when compared any insecticide (ivermectin, imidacloprid, spinosad). The activity of lidocaine as an insecticide was equivalent to commercial insecticides. This is a surprising result, and one that was observed both with lidocaine in solution and lidocaine infused into an elastomeric band. See FIGS. 8 and 9 compared to FIGS. 11 and 12.

Tetrahydrofuran and isopropyl myristate demonstrated no insecticide or repellant activity, confirming that the insecticide/repellent effects are the result of the insecticide infused within elastomeric band and not other components of the solution in which the bands are submersed to infuse the active ingredients. The results for tetrahydrofuran and isopropyl also confirm that the insecticide/repellent effects of lidocaine infused into the elastomeric band are the result of the lidocaine within elastomeric band and not other components of the solution in which the bands are submersed to infuse the lidocaine. These are surprising results. See FIGS. 8 and 9 compared to FIGS. 11 and 12.

Example 4

Evaluation of duration of efficacy of anti-myiasis activity by elastomeric bands loaded/infused with insecticide, with or without an active agent for the topical treatment of pain, was studied via ex vivo tissue and band collection and using Maggot Inhibitory Assay (MIA).

Experimental goal: The aim of this experiment was to assess the long-term function of elastomeric bands infused with insecticide, with or without lidocaine, to inhibit the growth of larvae using the novel MIA test disclosed herein, by evaluating the function of ex vivo tissue biopsies taken from scrotal tissue and drug-infused elastomeric bands which were previously placed on Holstein calves for various time periods (3, 7, 14, 21 and 30 days). The protocol used and presented here is based on published literature (Kotze et al., (2022) "Resistance to dicyclanil and imidacloprid in the sheep blowfly, *Lucilia cuprina*, in Australia", *Pest Manag Sci*, 78:4195-4206).

Experimental Test Matrix:

Control scrotal tissue biopsies: 2×4 mm control biopsy punches homogenized in sterile water and mixed with WCF. These control biopsy punches were taken from control tissue prior to affixing an elastomeric band to the animals (CTB), as well as from distal tissue (i.e., >20 cm from band site) at the indicated time points after the elastomeric band was affixed (DTB). (n=3)

Homogenizer Control chicken feed: Homogenized sterile water was mixed with WCF to prepare this control. (n=3)

Master Control chicken feed: WCF alone. (n=3×5 experiments=15)

Ivermectin control: A solution of ivermectin was prepared as a positive control (1.31 g ivermectin into 2.35 g of THF). (n=3)

Exposed ILLB: Elastomeric bands infused with ivermectin and lidocaine that were affixed to scrotal sites and removed at each time point. (n=3×5 experiments=15)

Control ILLB: Elastomeric bands infused with ivermectin and lidocaine that were not affixed to an animal. (n=3)

Control Band: Elastomeric band without any infused active ingredients was used as a control band. (n=3)

One (1) test organism: *Hermetia illucens* larvae, "medium size" 3rd instar feeding (crop-full), mean weight 45-60 mg.

Testing: Tests were conducted in real time as bands came off the animals resulting in four runs of the study.

Objective of the Study:

The purpose of this study was to assess the long-term function of elastomeric bands infused with insecticide, with or without lidocaine, to inhibit the growth of larvae by a novel MIA, by evaluating the function of ex vivo tissue biopsies taken from scrotal tissue and elastomeric bands which were placed on Holstein calves for various time periods (3, 7, 14, 21 and 30 days) exposure.

A secondary goal of this experiment was to demonstrate long-term slow-release profile of the insecticide effect obtained by the elastomeric bands. It was anticipated that the effective concentration of insecticide will elute out of the band quickly while it is in contact with the environment and the animal tissue (e.g. based on Examples 2 & 3 showing surprising immediate effectiveness). Thus, it was expected to observe a significant reduction or loss of insecticide activity compared to a fresh band/treatment over time. Maintaining the effectiveness of the insecticide over time and elution exposure, reducing the need to re-apply insecticide, would surprisingly demonstrate slow-release technology and be a major improvement over the current state of insecticide treatments (e.g. pour-on insecticide). Indeed, demonstrating equivalent function over extended time would be a very surprising result.

Another secondary goal of this experiment was to demonstrate that the elastomeric bands infused with insecticide are able to achieve targeted insecticide delivery to the site of the wound (i.e. where the band is placed) to reduce environmental exposure, resistance, and systemic uptake into the animal. Current state of art pour-on insecticides have an insecticide effect by getting taken up by the animal's dermis and distributed systemically. Demonstrating equivalent, targeted efficacy while demonstrating that the insecticide and/or insect repellent does not have systemic distribution would be an advantageous and surprising result.

Sample Description:

A list of the samples used in the experiment are described in Table 3, below.

TABLE 3

Description of Samples

| CODE | Sample ID | SAMPLE | Description |
| --- | --- | --- | --- |
| CTB-0 | CTB-1<br>CTB-2<br>(each animal) | Control Tissue Biopsy | 2 biopsies taken from each animal on Day 0 before band placement. Snap frozen. |
| DTB-DayX | DTB-DX<br>DTB-DX<br>(each animal) | Distal Tissue Biopsy | 2 biopsies taken from each animal on Day X 20 cm distal from band. Snap frozen. |
| HC | HC-1<br>HC-2<br>HC-3 | Homogenizer Control | Homogenized pure ethanol mixed with WCF. |
| MC | MC-1<br>MC-2<br>MC-3 | Master Control | WCF alone. Run as master control in each experimental study |
| I | I-1<br>I-2<br>I-3 | Ivermectin | 1.31 g of ivermectin into 2.35g of THF |
| E-ILLB | E-ILLB-DX<br>(each animal) | Animal-affixed Band | Used elastomeric band infused with ivermectin and lidocaine, taken from each animal at each time point. Sample is placed on WCF. |
| C-ILLB | C-ILLB-1<br>C-ILLB-2<br>C-ILLB-3 | Control Insecticide Band | Control elastomeric band infused with ivermectin and lidocaine, but never affixed to an animal. Sample is placed on WCF. |
| OTS | OTS-1<br>OTS-2<br>OTS-3 | Control Band | Elastomeric band off-the-shelf and without any active ingredient infused. No exposure to infusion solution at all. |

A list of the animal treatments used in the experiment are described in Table 4, below.

TABLE 4

Description of the Animal Treatments

| Test Group | Number of Animals | Sampling Time | Treatment | Dosage | Biopsy Samples |
| --- | --- | --- | --- | --- | --- |
| A | 3 males | 3 Days | Castration with Elastomeric Band infused with ivermectin and Lidocaine | ~70 mg/band | 2 Control, T = 0<br>2 distal, 4 Test, T = 3d |
| B | 3 males | 7 Days | Castration with Elastomeric Band infused with ivermectin and Lidocaine | ~70 mg/band | 2 Control, T = 0<br>2 distal, 4 Test, T = 7d |
| C | 3 males | 14 Days | Castration with Elastomeric Band infused with ivermectin and Lidocaine | ~70 mg/band | 2 Control, T = 0<br>2 distal, 4 Test, T = 14d |
| D | 3 males | 21 Days | Castration with Elastomeric Band infused with ivermectin and Lidocaine | ~70 mg/band | 2 Control, T = 0<br>2 distal, 4 Test, T = 21d |

TABLE 4-continued

Description of the Animal Treatments

| Test Group | Number of Animals | Sampling Time | Treatment | Dosage | Biopsy Samples |
|---|---|---|---|---|---|
| E | 3 males | 30 Days | Castration with Elastomeric Band infused with ivermectin and Lidocaine | ~70 mg/band | 2 Control, T = 0<br>2 distal, 4 Test, T = 30d |

Contact Times: 3, 7, 14, 21, 30 days on animal.

Contact Temperature: Body temperature.

Identification method: Each animal was distinguished by two forms of identification (e.g., ear tag, numbered neck band, numbered leg band, numbered halter, brand, and/or painted number, etc.), which bore the same number and corresponded to a general description of the animal in the study record.

Animal Care: This study was conducted in compliance with the animal care guidelines established by the Canadian Council on Animal Care (Guide for the Use and Care of Experimental Animals, Volume 1. 2nd edition, 1993). Pre-study approval by an Investigational Animal Care and Use Committee (IACUC) was a requirement. CCR IACUC (OLAW Accession Number: F19-00433 (A8217-03)). Animal Approval was obtained on Jan. 22, 2024 (approval: 01.22.2024 12999.010.03.05).

Owner consent: Consent for animal participation was obtained.

Study facility: The animals participated and were housed and managed as research subjects under laboratory conditions. Additional information on the animals is shown on Table 5, below.

TABLE 5

Animal Details

| Organism | Source | Specific details |
|---|---|---|
| Bovine calves | Commercial sources | Source: Commercial sources<br>Number: 15 animals total<br>Gender: Males, intact<br>(target animal and condition)<br>Breed: Holstein and Holstein Cross<br>Age: Maximum of 6 weeks of age<br>(40 to 90 kg)<br>Body weight: Commensurate with the age<br>Health: Clinically healthy on day 0 |

In Vivo Test Method Overview:

Animals were randomly allocated to the study. 2 control biopsies were taken and retained for control purposes on Day 0. Elastomeric bands infused with ivermectin and lidocaine were placed on calves per standard banding practice. The user wore protective equipment. Animal IDs and treatment codes were recorded. At the specified time points (Day 3, 7, 14, 21, 30) the band site was photographed, the band was removed and retained, 4 biopsies were removed from the band site and retained for analysis. 2 biopsies were taken 20 cm distal to the band site to serve as distal sample controls. Animals were re-banded with a standard ligation band, given an appropriate dose of oral meloxicam and returned to the source herd. Animals were monitored for any adverse effects.

Figure 13:
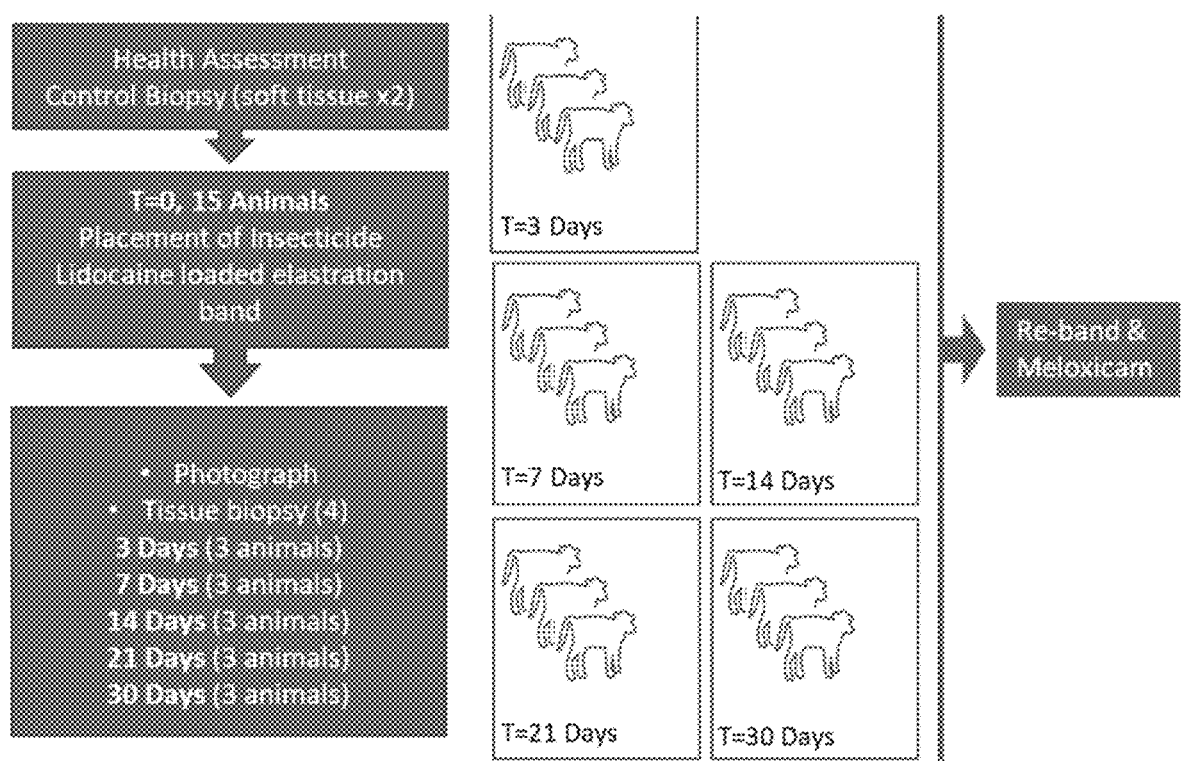
FIG. 13 shows a diagrammatic overview of the animal use test plan of Example 4.

See FIG. 13 for diagrammatic overview of the animal use test plan.

In Vitro Test Method Overview:

Fresh WCF and *Hermetia illucens* larvae (3rd instar feeding (crop-full) mean weight 45-60 mg) were obtained within 48 hours of the start of the testing. A small (60 mm diameter) petri dish served as the test container for each replicate. WCF was placed into the center of the container and weighed. Test substances were infused into the WCF. The control utilized an approximately similar-sized sample of WCF without any band solutions being incorporated. Each test and control article were placed in the ECF and then into an individual 60 mm container. Five (5) larvae were placed on each test and control article infused WCF. The lid was placed on the container, and this was wrapped in parafilm. The test and control containers were kept in an incubator at ~30° C. temperature, in the dark. Larvae were weighed and observed daily up to two (2) weeks, noting motility and pupation. Primary metric was larvae weight gain.

Figure 14:
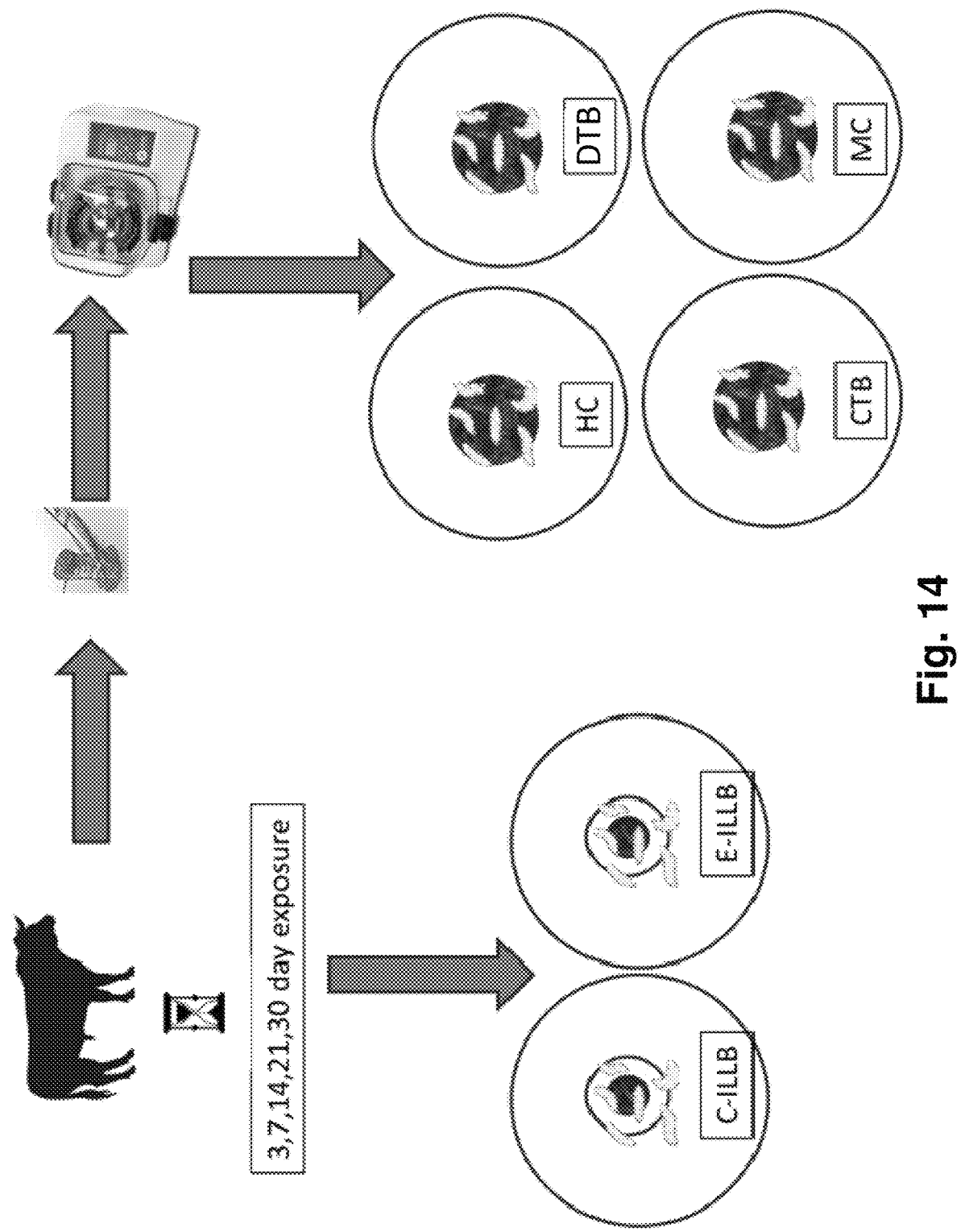
FIG. 14 shows a diagrammatic overview of the ex vivo tissue and elastomeric band Maggot Inhibitory Assay (MIA) test plan of Example 4.
Figure 15:
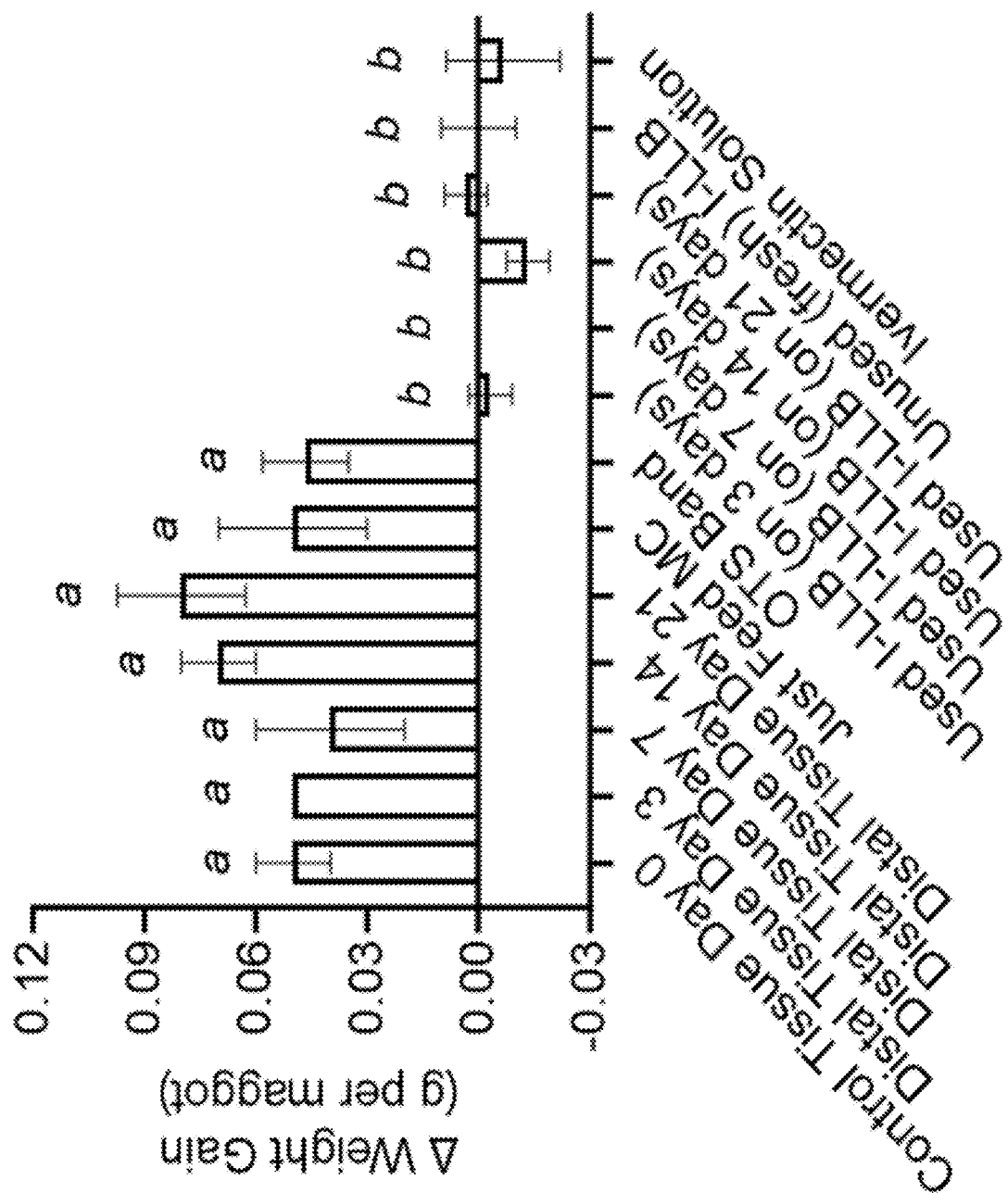
FIG. 15 is a graph showing the weight increase (over 3 days) of maggots exposed to ex vivo distal tissue (from animals treated for 3, 7, 14, or 21 days) and exposed to elastomeric bands (controls and previously affixed bands) for Day 3 and Day 7 exposure, compared to Day 0.

See FIG. 14 for diagrammatic overview of ex vivo tissue and band use test plan.

In Vivo Methods:

Admission to study: Animals were randomly allocated to the study. Animal ID and assignment to treatment groups were recorded. Ear tag identification was used to indicate which treatment group the animal was assigned.

Control Biopsy: Before castration. 2 control biopsies were taken and retained for control purposes. Each biopsy sample was placed in a separate, appropriately labelled microtube, and frozen at −80° C. for processing at a later point.

Castration of calves: Elastomeric bands infused with ivermectin and lidocaine were placed on the prongs of the applicator. The elastrator was held with the prongs facing up, and the handles were closed to open the band. With both testicles in the scrotum, the band was stretched and slipped up over the scrotum. The band was released just above the top of the testicles (~0.5 cm), not at the base of the scrotum.

Sample collection: At the specified time points (Day 3, 7, 14, 21, 30), the elastomeric band site was photographed, and the band was removed and retained in a labelled container. If the band and the distal tissue were absent no sample was taken, and a note was made on the collection form.

Distal Control Biopsy: 2 control biopsies were taken 20 cm away from band site and retained for control purposes (i.e. to determine if delivery of the ivermectin was local or systemic).

Follow up: Animals were re-banded with a standard ligation band, given an appropriate dose of oral meloxicam, and returned to the source herd. Animals were monitored for any adverse effects.

Tissue Homogenization:

The frozen biopsy punch was thawed, and the two punch biopsies were placed into a labelled milling tube. An appropriate volume (1.5 mL) of reagent ethanol was added. The milling tubes were placed into a Bead Mill Homogenizer and homogenized at maximum speed (Speed Setting 5=5 m/s) for 30 seconds. Homogenization was repeated two more times (30 seconds each), with at least 1 minute of cool-down time in between. 1000 μL of the sample was used for testing.

Test Article Preparation:

*Hermetia illucens* larvae (3rd instar feeding (crop-full) mean weight 45-60 mg) were obtained within 48 hours of the start of the testing.

Fresh WCF test samples were prepared: An equal weight of chicken feed and sample w/w (i.e. water or homogenate) was used. Enough was prepared for 2.0 g per assay (total WCF weight per treatment). Dry chicken feed was placed into a labelled container (1 g chicken feed/container). 1 mL of homogenate (or liquid) was added to the chicken feed to make the WCF test samples with the test or control agents mixed in. The WCF test samples were mixed thoroughly, and allowed samples to dry overnight (~16 hours) to allow ethanol to evaporate. At time of testing, 1000 μL of water was added to make the chicken feed samples into a wet paste.

The ivermectin solution positive control was prepared as described in Example 3.

Small (60 mm diameter) petri dishes were used as the test container for each replicate.

An about 50 mm diameter disc of Whatman filter paper (90 mm, Cat no. 1001-090) was cut, wetted with 1000 μL distilled water and placed in the petri dish.

Test and control containers had about 2.0 g of test solution infused WCF placed into the center of the wetted filter paper.

Conduct of the Test:

Each test and control article were prepared in an individual 60 mm container before the study starts. Test and control elastomeric bands had 1 g of fresh wet control chicken feed manually pressed into the center hole such that the ring was filled to overfill with control WCF. The weight of the WCF was recorded.

Five (5) larvae were weighed as a group and recorded for each test and control article. The lid was placed on the container and was wrapped in parafilm. The test and control containers were kept in an incubator at temperature ~30° C. in the dark. Larvae were observed daily for 8 to 10 days, noting observations on food consumption, weight and pupation.

The weight of the 5 larvae in each assay replicate were determined and recorded by: (a) removing the lid from the base and placing the lid on the scale; and (b) taring the scale and gently placing the 5 larvae into the lid and recording the total weight.

The number of larvae in the pupation stage was recorded (very dark coloration, not moving nor feeding).

Results

FIG. 15 shows the weight increase of maggots exposed to ex vivo distal tissue and exposed to elastomeric bands (controls and previously affixed bands). The results shown in FIG. 15 represent the average maggot weight change of larvae from Day 0 to Day 3. Standard deviations are presented as error bars. Control tissue, Distal tissue (Day 3), Distal Tissue (Day 7), Distal Tissue (Day 14), and Distal tissue (Day 21) all had equivalent or superior maggot growth compared to the master control and off the shelf control bands. Unused elastomeric band, used elastomeric band (Day 3), used elastomeric band (Day 7), used elastomeric band (Day 14), and used elastomeric band (Day 21), whereby all bands were infused with ivermectin and lidocaine when produced, all demonstrated a decline or no weight gain consistent or greater than the ivermectin solution (positive control).

Conclusions

Control Tissue, Distal tissue (Day 3) and Distal tissue (Day 7) had equivalent or superior maggot growth compared to the master control and the off-the-shelf control bands. The equivalent or superior maggot growth compared to the master control demonstrates that the insecticide did not transfer systemically. Current state of art pour-on insecticides have an insecticide effect by getting taken up by the animal's dermis and distributed systemically. Demonstrating equivalent, targeted efficacy while demonstrating that the insecticide/repellant does not have systemic distribution is a surprising and advantageous result.

Elastomeric bands that had previously been affixed ex vivo to an animal and removed (i.e. used bands) on Day 3 and from Day 7 demonstrated equivalent insecticide/repellent activity when compared to a fresh elastomeric band that had never been affixed to an animal (i.e. unused band). This equivalent functionality to fresh elastomeric band, even after extended environmental and animal elution, is a surprising result, evidencing a long-term, slow-release profile of the insecticide/repellant from the elastomeric bands. Combining this result with Example 2 showing that the elastomeric bands also exhibit a fast-release profile is significantly advantageous and surprising.

Maintaining the effectiveness of the insecticide over time and over prolonged elution exposure, reduces the need to re-apply insecticide, especially when combined with an immediate action fast-release effect. The elastomeric bands of the present disclosure represent a major improvement in insect control for animals, including over the current state of art (i.e. pour-on insecticide).

Moreover, the used elastomeric bands (Day 3 and Day 7) demonstrated equivalent insecticide/repellent activity when compared to fresh liquid ivermectin solution, all demonstrating a decline or no weight gain. This shows that the insecticide loaded bands have equivalent function to fresh liquid Ivermectin, even after extended environmental and animal elution. This strong, prolonged anti-myiasis activity was not expected. Rather, it was anticipated that the fresh insecticide in liquid form, soaked into the feed, would be more effective than when it is contained in an elastomeric band, let alone a band that has already been used on an animal for 3 days and 7 days. It was expected that the insecticide would have eluted out over time while exposed to the animal and environment and would have a reduced insecticide effect.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of or" consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be referenced herein, the definitions that are consistent with this specification should be adopted.

Many obvious variations of the embodiments set out herein will suggest themselves to those skilled in the art in light of the present disclosure. Such obvious variations are within the full intended scope of the appended claims.

We claim:

1. A method for treating or controlling myiasis in an animal during castration, tail docking, umbilical cord ligation, or dehorning of the animal, the method comprising:
   affixing to the animal an elastomeric band having infused or contained within an elastomeric material of the elastomeric band an active agent for the topical control of pain and an insecticide,
   wherein the insecticide is an insect growth regulator, a macrocyclic lactone, a synthetic pyrethroid, an organophosphate, a spinosyn, a neonicotinoid, or any combination thereof;
   wherein the affixing of the elastomeric band to the animal is proximate an existing wound site or an impending wound site; and
   wherein the elastomeric band is capable of releasably delivering the insecticide locally to the existing wound site or the impending wound site to kill fly larvae absent substantial systemic distribution of the insecticide to a tissue of the animal more than 20 cm from the existing wound site or the impending wound site.

2. The method of claim 1, wherein the affixing provides both:
   a short-term and a long-term delivery and effect of the active agent for the topical control of pain; and
   the insecticide to a body surface of the animal and/or an environment in close proximity to the body surface.

3. The method of claim 1, wherein said affixing provides:
   a fast-acting mode in which a first portion of the active agent for the topical control of pain and the insecticide is delivered to a body surface of the animal and/or an environment in close proximity to the body surface, immediately upon affixing the elastomeric band to the animal; and
   a slow-releasing mode in which a second portion of the active agent for the topical control of pain and the insecticide is delivered to the body surface of the animal and/or the environment in close proximity to the body surface, gradually over a period of time after continued affixation of the elastomeric band to the animal.

4. The method of claim 3, wherein:
   the fast-acting mode provides a short-term delivery and effect of the active agent for the topical control of pain and the insecticide to the body surface of the animal and/or the environment in close proximity to the body surface; and
   the slow-releasing mode provides a long-term delivery and effect of the active agent for the topical control of pain and the insecticide to the body surface of the animal and/or the environment in close proximity to the body surface.

5. The method of claim 2, wherein the short-term delivery and effect is a duration of between about 0 seconds and about 24 hours.

6. The method of claim 2, wherein the long-term delivery and effect is a duration of between about 24 hours and about 4 months.

7. The method of claim 1, wherein the active agent for the topical control of pain is lidocaine, procaine, meloxicam, bupivacaine, levobupivacaine, or any combination thereof.

8. The method of claim 1, wherein the active agent for the topical control of pain is lidocaine.

9. The method of claim 1, wherein the elastomeric band further comprises one or more skin permeation or penetration enhancers.

10. The method of claim 9, wherein the skin permeation or penetration enhancer comprises a fatty acid, a fatty acid ester, a poloxamer, a triglyceride, n-methyl pyrrolidone, terpineol, limonene, dimethyl sulfoxide, dimethylacetamide, isopropyl myristate, or any combination thereof.

11. The method of claim 1, wherein the insecticide is ivermectin or avermectin.

12. The method of claim 1, wherein the insecticide is a larvicide and is delivered to the animal at an effective larvicidal amount.

13. The method of claim 1, wherein the insecticide is effective against lice, cattle grubs, screw worms, flies, mites, maggots, or larvae.

14. The method of claim 1, wherein the insecticide is effective against *Phormia regina, Protophormia terraenovae, Lucilia sericata, Lucilia illustris, Lucilia cuprina, Lucilia sericata, Calliphora stygia, Cochliomyia macellaria, Cochliomyia hominivorax, Dermatobia hominis, Hypoderma bovis, Hypoderma lineatum, Oestrus ovis*, or a combination thereof.

15. The method of claim 1, wherein the elastomeric material is selected from:

a natural rubber, a synthetic rubber, a silicone, a polybutadiene, a polyisoprene, a polychloroprene, a nitrile, a poly (styrene-butadiene-styrene) (SBS), a styrene-ethylene-butylene-styrene (SEBS), an ethylene-propylene-diene monomer rubber (EPDM), a polyurethane, or any combination thereof.

16. The method of claim 1, wherein the animal is a cattle, goat, sheep, pig, deer, elk, buffalo, bison, moose, alpaca, horse, donkey, zebus, yak, gayal, reindeer, or camel.

17. The method of claim 1, wherein the elastomeric band is affixed to the animal on or at a base of an animal part selected from a tail, a scrotum, a horn, an umbilical cord, or an antler.

18. The method of claim 1, wherein:
only a portion of the elastomeric band comprises the active agent for the topical control of pain and/or the insecticide, and
the portion comprises a defined and selective region or zone of active agent.

19. The method of claim 1, wherein the elastomeric material is infused with the active agent for the topical control of pain and the insecticide.

* * * * *